US010405214B2

(12) United States Patent
Fujiwara et al.

(10) Patent No.: US 10,405,214 B2
(45) Date of Patent: Sep. 3, 2019

(54) WIRELESS COMMUNICATION SYSTEM

(71) Applicant: KABUSHIKI KAISHA TOSHIBA, Tokyo (JP)

(72) Inventors: Yoshinobu Fujiwara, Ome Tokyo (JP); Toshifumi Ohtake, Yokohama Kanagawa (JP); Tomohiro Kanda, Saitama Saitama (JP); Atsushi Nakajima, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/694,572

(22) Filed: Sep. 1, 2017

(65) Prior Publication Data

US 2018/0270675 A1    Sep. 20, 2018

(30) Foreign Application Priority Data

Mar. 15, 2017    (JP) .................................. 2017-049686

(51) Int. Cl.
| H04W 24/04 | (2009.01) |
| H04L 29/06 | (2006.01) |
| H04W 12/06 | (2009.01) |
| H04W 28/02 | (2009.01) |
| H04W 48/06 | (2009.01) |
| H04W 48/10 | (2009.01) |
| H04W 48/20 | (2009.01) |
| G06Q 30/02 | (2012.01) |

(Continued)

(52) U.S. Cl.
CPC ............. *H04W 24/04* (2013.01); *H04L 63/08* (2013.01); *H04W 12/06* (2013.01); *H04W 28/0236* (2013.01); *H04W 48/06* (2013.01); *H04W 48/10* (2013.01); *H04W 48/20* (2013.01); *G06Q 30/0277* (2013.01); *H04W 48/14* (2013.01); *H04W 84/12* (2013.01)

(58) Field of Classification Search
CPC ..... H04W 24/04; H04W 48/06; H04W 12/06; H04W 48/10; H04W 28/0236; H04L 63/08; G06Q 30/0277
See application file for complete search history.

(56) References Cited

U.S. PATENT DOCUMENTS 9,485,716 B2    11/2016  Seok
2006/0079232 A1*  4/2006  Omori ............... H04W 36/0088
                                                         455/436

(Continued)

FOREIGN PATENT DOCUMENTS

JP    2012213110 A    11/2012
JP    2015080133 A    4/2015
(Continued)

*Primary Examiner* — Brian D Nguyen
(74) *Attorney, Agent, or Firm* — Kim & Stewart LLP

(57) ABSTRACT

According to one embodiment, a wireless access point includes a wireless communication unit to receive an authentication frame that includes attribute information of a wireless communication terminal and to transmit a response frame in response to the authentication frame. A retransmission limit setting unit sets a limit for transmissions of the response frame based on the attribute information included in the authentication frame. A controller controls transmission of the response frame according to the retransmission limit.

15 Claims, 17 Drawing Sheets

(51) Int. Cl.
  *H04W 84/12*   (2009.01)
  *H04W 48/14*   (2009.01)

(56) References Cited

U.S. PATENT DOCUMENTS

| | | | |
|---|---|---|---|
| 2009/0190553 A1* | 7/2009 | Masuda | H04W 8/005 |
| | | | 370/331 |
| 2009/0262718 A1* | 10/2009 | Meier | G06Q 20/3674 |
| | | | 370/338 |
| 2012/0030353 A1* | 2/2012 | Balogh | H04W 48/18 |
| | | | 709/224 |
| 2012/0250547 A1 | 10/2012 | Fujita et al. | |
| 2013/0237216 A1* | 9/2013 | Ong | H04W 8/005 |
| | | | 455/434 |
| 2015/0230158 A1* | 8/2015 | Kim | H04W 76/18 |
| | | | 370/328 |
| 2015/0237572 A1* | 8/2015 | Kim | H04W 48/20 |
| | | | 370/329 |
| 2015/0296454 A1* | 10/2015 | Lee | H04W 52/0209 |
| | | | 370/311 |
| 2016/0100352 A1 | 4/2016 | Yunoki | |
| 2017/0238162 A1* | 8/2017 | Yasuda | H04M 3/42 |
| | | | 370/329 |
| 2017/0332315 A1* | 11/2017 | Jeong | H04W 48/16 |

FOREIGN PATENT DOCUMENTS

| | | |
|---|---|---|
| JP | 2015521438 A | 7/2015 |
| JP | 2015226261 A | 12/2015 |
| JP | 2016072917 A | 5/2016 |
| WO | 2014188832 A1 | 11/2014 |

\* cited by examiner

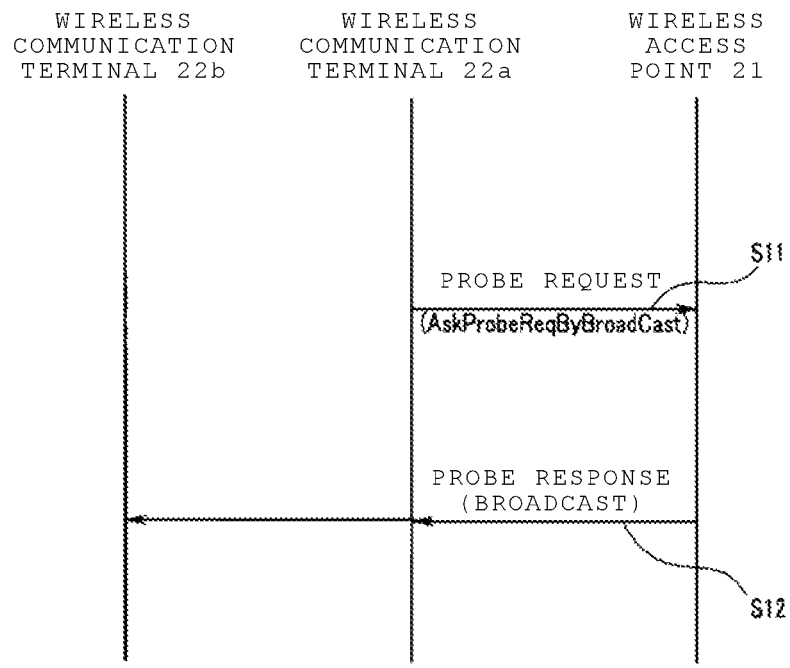
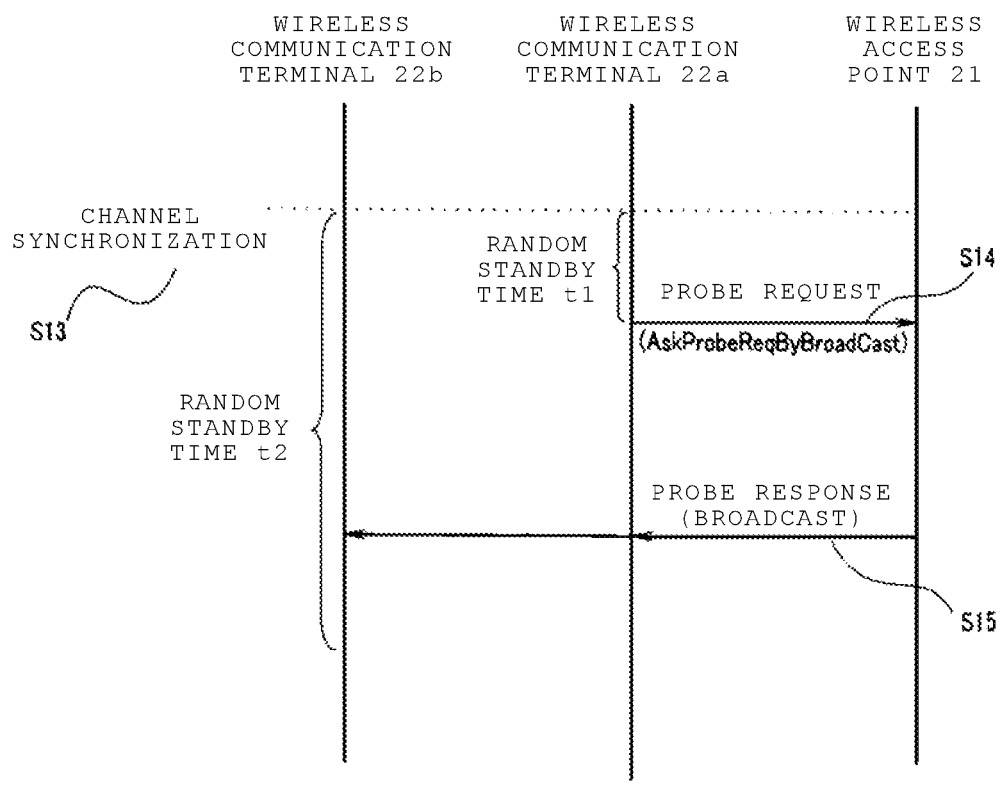

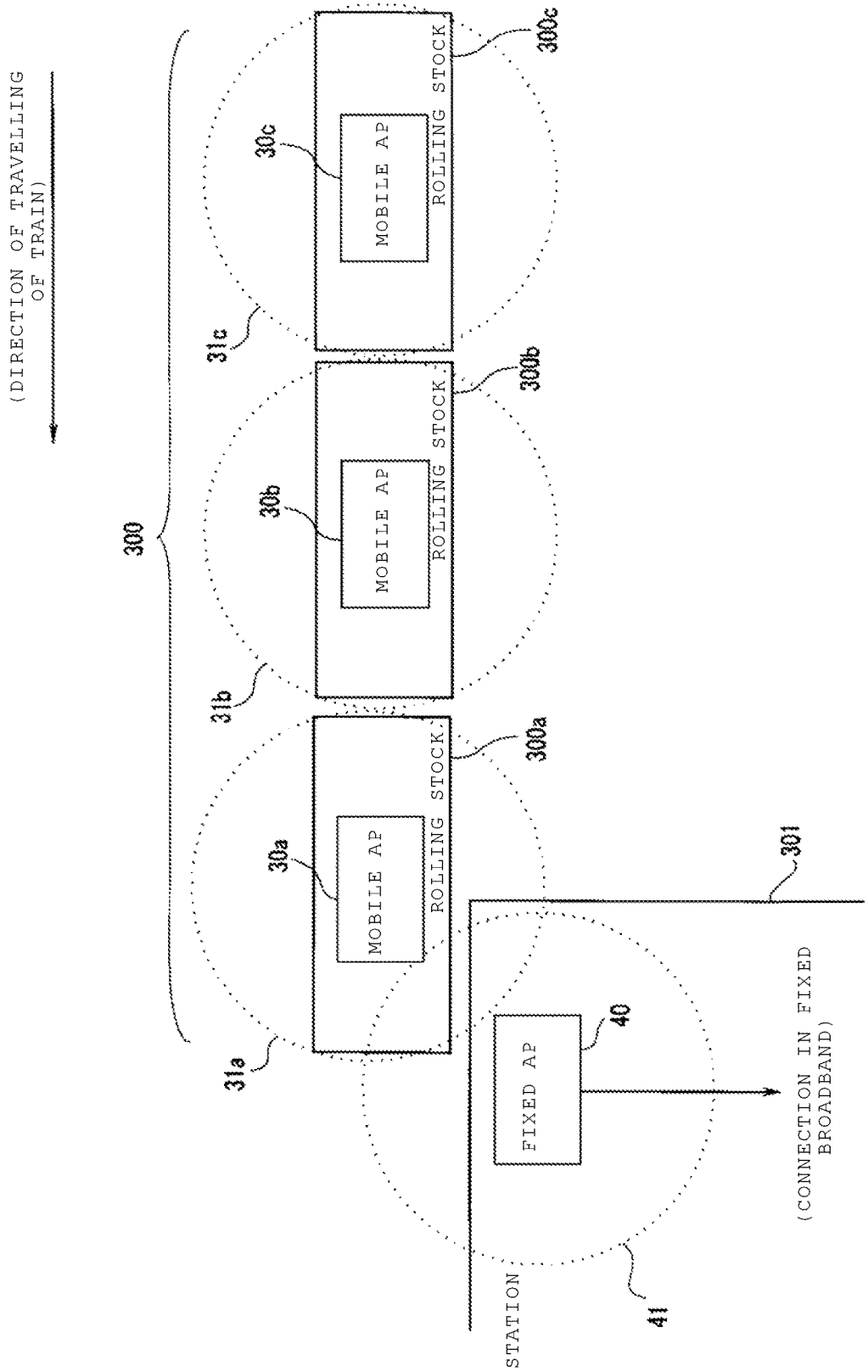

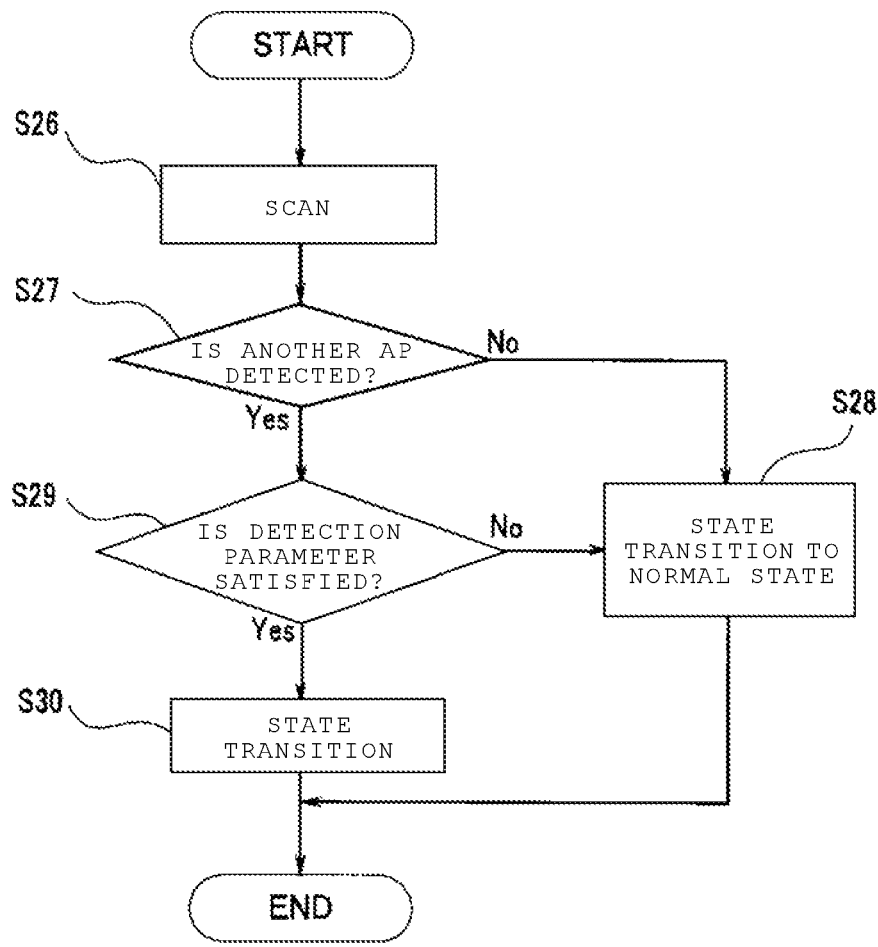

WIRELESS COMMUNICATION SYSTEM

CROSS-REFERENCE TO RELATED APPLICATION

This application is based upon and claims the benefit of priority from Japanese Patent Application No. 2017-049686, filed Mar. 15, 2017, the entire contents of which are incorporated herein by reference.

FIELD

Embodiments described herein relate generally to a wireless communication system.

BACKGROUND

In recent years, with the widespread use of smartphones and the like, there has generally been a tendency for a person to carry one or more wireless communication terminals (each of which may also be referred to a station (STA)). Particularly, in a place where many people gather, such as a rail station or an event site, a frequency band that is used for the wireless LAN is considerably congested because wireless access points (AP) that use a wireless LAN or the wireless communication terminals converge and a communication failure may be caused.

A main reason for the wireless congestion in this context is the periodic transmission of an access point search packet that is sent out such as when a beacon is sent out from the wireless access point, when an AP inquiry (a probe request) is made by the wireless communication terminal, or when a response (a probe response) to the AP inquiry is made by the wireless access point. Normally, because a low-speed communication scheme is used for the transmission of these packets, the time that is occupied by each of the packets is relatively long. Consequently, the communication of these packets limits more opportunities for actual data communication from being provided, and thus causes a problem in that not only is bandwidth utilization efficiency decreased, but also a communication failure is caused.

DESCRIPTION OF THE DRAWINGS

FIG. 4 is a diagram for describing a communication sequence for a probe request and a response to the probe request according to the second embodiment.

FIG. 5 is a diagram for describing another example of the communication sequence for the probe request and the response to the probe request according to the second embodiment.

FIG. 6 is an overall diagram of a wireless communication system according to a third embodiment.

FIG. 13 is a flowchart for describing the procedure for causing the state of a wireless access point to transition.

FIG. 14 is an example of a list that is registered in the state transition condition storage unit.

DETAILED DESCRIPTION

Embodiments provide a wireless communication system that provides more opportunity for data communication and improves bandwidth utilization efficiency.

In general, according to one embodiment, a wireless access point includes a wireless communication unit configured to receive an authentication frame that includes attribute information of a wireless communication terminal transmitting the authentication frame. The wireless communication is also configured to transmit a response frame to the wireless communication in response to the authentication frame. A retransmission limit setting unit is configured to set a retransmission limit for transmissions of the response frame by the wireless communication unit based on the attribute information included in the authentication frame. And, a controller is configured to control transmission of the response frame by the wireless communication unit according to the retransmission limit set by the retransmission limit setting unit.

Example embodiments will be described below with reference to the drawings.

First Embodiment

Figure 1:
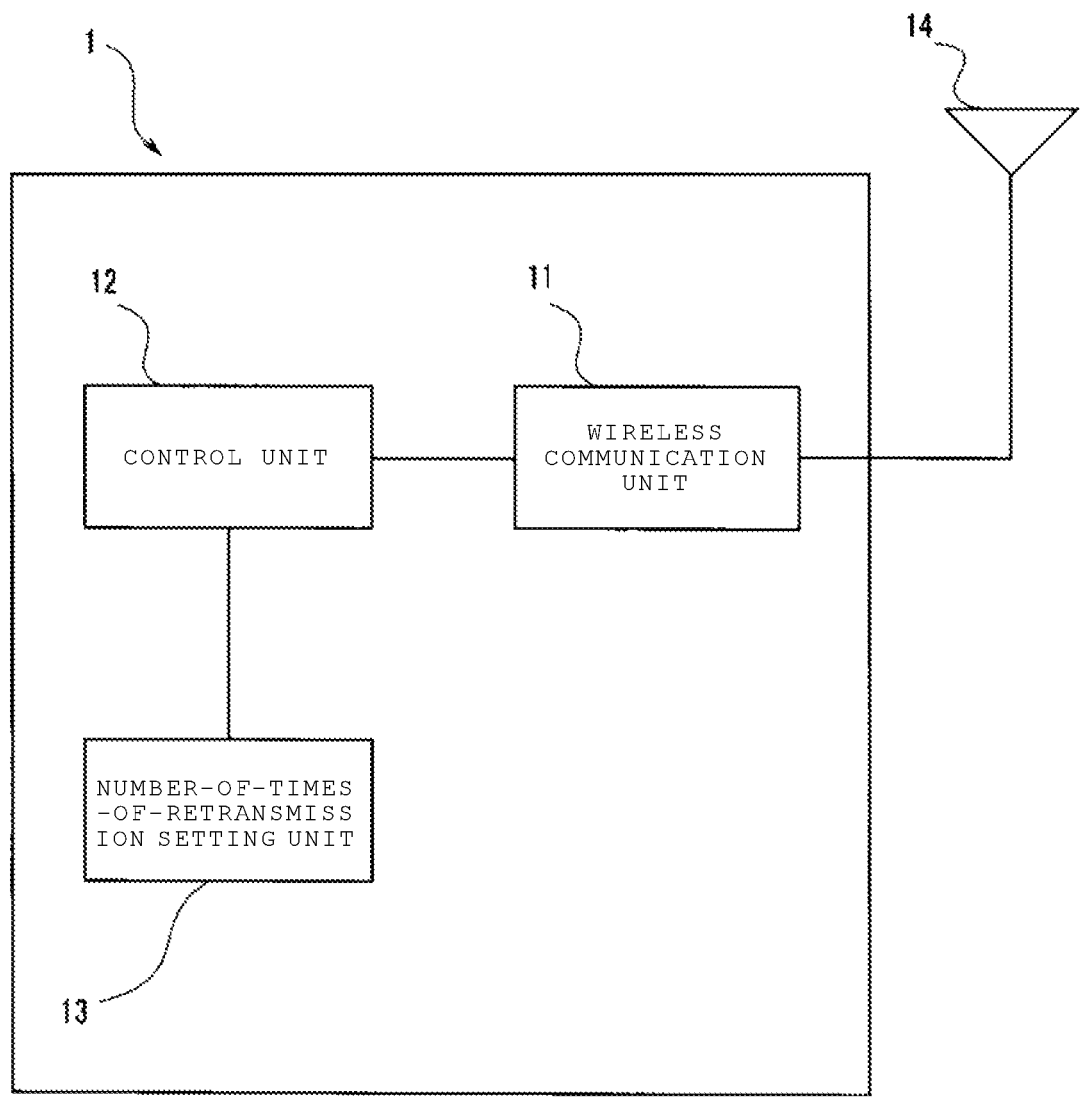
FIG. 1 is a schematic block diagram illustrating a configuration of a wireless access point according to a first embodiment of the present disclosure.

FIG. 1 is a schematic block diagram illustrating a configuration of a wireless communication system according to a first embodiment of the present disclosure. A wireless access point in the wireless communication system according to the present embodiment has a wireless communication interface and performs wireless communication to a wireless communication terminal within a wireless communication-available area.

The wireless access point 1 has a wireless communication unit 11, a control unit 12, a number-of-times-of-retransmission setting unit 13 (also referred to as setting unit 13 for simplicity), and an antenna 14.

The wireless communication unit 11 receives data from a wireless communication terminal in the vicinity or transmits data according to instructions from the control unit 12. Specifically, the data is transmitted in a sequence of processes (e.g., a probe request or response, a wireless authentication procedure, a connection approval procedure, an encryption key exchange, and the like) for establishing a wireless connection is received from the wireless communication terminal and a response is transmitted. Furthermore, after a wireless connection has been established, data can communicated at any time between the wireless access point 1 itself and the wireless communication terminal.

Based on a control program that is stored in a storage unit (not illustrated) such as a ROM, the control unit 12 controls all operations by the wireless access point 1. Specifically, the wireless communication unit 11 is instructed by the control program to perform data communication or processing of data. Furthermore, information can be extracted from the data that has been received and the extracted information is output to the setting unit 13. Additionally, the number of times for retransmission of data is acquired from the setting unit 13, and data communication is performed accordingly.

Based on information that is acquired from the control unit 12, the setting unit 13 determines the number of times that data will be transmitted from the wireless communication unit 11. Specifically, based on an elementary data of a probe request that is input from the control unit 12, the number of times for retransmission of a probe response is determined. Then, the determined number of times of retransmission is output to the control unit 12.

Next, a method of determining the number of times of retransmission of the probe response in the setting unit 13 is described. With active scan in a wireless LAN system in compliance with IEEE 802.11, the probe request is transmitted to the wireless access point in order for the wireless communication terminal to check for the presence of the wireless access point in the vicinity. Upon receiving the probe request, the wireless access point transmits the probe response in order to indicate its presence. Because the probe response is transmitted as a unicast, the wireless communication terminal that receives the probe response will reply with an ACK frame. In a case where the ACK frame is not received, the wireless access point repeatedly transmits the probe response for up to the predetermined number of times that has been set in advance.

At this point, typically in a frequency bandwidth of 2.4 GHz for backward compatibility, a frame that is modulated at DSSS 1 Mbps is used for the probe request and the probe response, but there are times when a frame at DSSS 1 Mbps is also received on a channel with a deviation of approximately plus and minus 5 MHz to 10 MHz, however, the reception fidelity at the wireless communication terminals depends on the particular characteristics of each terminal and its positional relationship with respect to the wireless access point terminals.

When it is easy for the wireless access point to perform reception on a channel with a deviation, the wireless access point receives the probe request, which is transmitted by the wireless communication terminal on a channel at a frequency that is somewhat deviated from a channel that is used by the wireless access point itself. In a case where transmission channel information (e.g., a DS parameter set) of the wireless communication terminal is not included in the probe request, the wireless access point assumes that the probe request is transmitted on the channel that is used by the wireless access point itself, and transmits the probe response on the same channel.

Nevertheless, when it is difficult for the wireless communication terminal to perform reception on the channel with a deviation the wireless communication terminal does not reply with the ACK frame because the wireless communication terminal cannot receive a probe request that is transmitted by the wireless access point. In this case, bandwidth utilization efficiency is decreased because the wireless access point is allowed to transmit the probe response repeatedly until the number of times of retransmission that has been set is reached.

In this manner, when there is a low probability that the probe response will be received by the wireless communication terminal, such as when DSSS modulation is used for communication and the channel information is not included in the probe request, the number of times of retransmission of the probe response can be set to a value that is less than a default value.

For example, in the wireless LAN system in compliance with IEEE 802.11, a default value for the number of times of retransmission (dot11ShortRetryLimit), which is used when data has a length that is equal to or less than a specific length, is standardized at 7, and a default value of the number of times of retransmission (dot11LongRetryLimit), which is used when data has a length that is greater than the specific length, is standardized at 4. In the case where the DSSS modulation is used for communication and where the channel information is included in the probe request, dot11ShortRetryLimit is set to 6 or less, and dot11LongRetryLimit is set to 3 or less, and thus the transmission of the probe responses that serves no purpose is suppressed.

It is noted when it is certain that the probe response will not be received by the wireless communication terminal even if transmitted, such as when the transmission channel information that is included in the probe request is different from channel information that is assumed by the wireless access point, the number of times of retransmission may be set to 0 and the probe response need not be made to be transmitted at all.

Furthermore, when an SSID element that is included in the probe request is a wildcard SSID and when there is a possibility that another wireless access point will transmit a probe response in addition to the wireless access point 1 itself, then the number of times of retransmission can be set to a value less than the default value.

Figure 2:
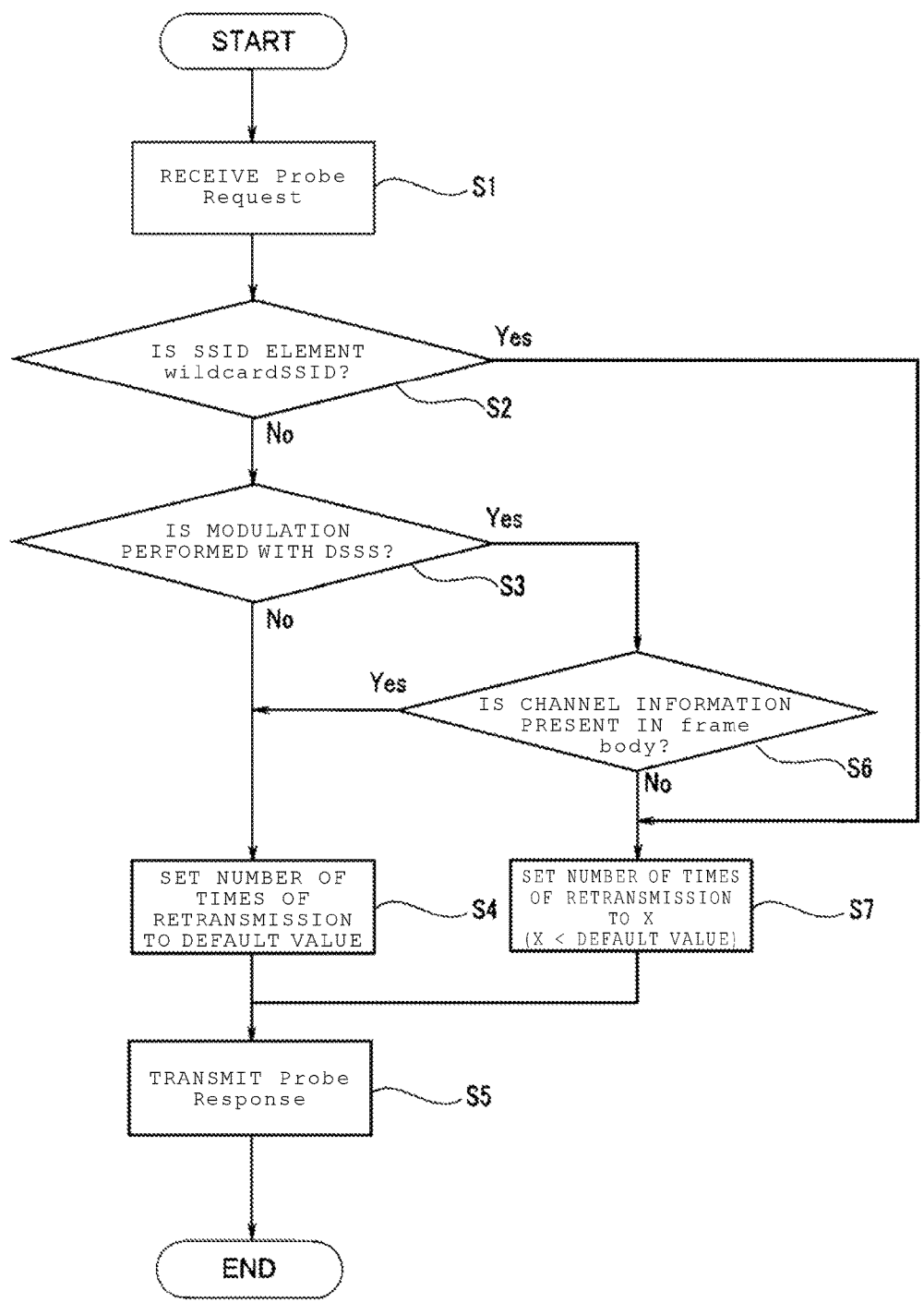
FIG. 2 is a flowchart for describing a procedure for transmission of a probe response according to the first embodiment.

Next, a procedure for the transmission of the probe response in the wireless access point 1 is described. FIG. 2 is a flowchart for describing the procedure for the transmission of the probe response in the first embodiment.

First, in the wireless communication unit 11, the probe request is received through the antenna 14 from a wireless communication terminal in the vicinity (S1). The wireless communication unit 11 outputs data of the received probe request to the control unit 12.

Next, the control unit 12 outputs the data of the probe request to the setting unit 13 and instructs the setting unit 13 to set the number of times of retransmission of the probe response. The setting unit 13 determines whether or not the SSID element that is included in the probe request is the wildcard SSID (S2). In a case where the SSID element is the wildcard SSID (Yes in S2), the number of times of retransmission of the probe response is set to a value that is less than some default value that has been registered in advance (S7). For example, in the wireless LAN system in compliance with IEEE 802.11, the dot11ShortRetryLimit value is set to be equal to or less than 6, and the dot11LongRetryLimit value is set to be equal to or less than 3. The setting unit 13 notifies the control unit 12 that the setting of the number of times of retransmission of the probe response has been completed. Last, the control unit 12 transmits the probe response for the number of times of retransmission that has been set (S5).

On the other hand, in a case where the SSID element that is included in the probe request is not the wildcard SSID (No in S2), it is determined whether or not the probe request is modulated with a DSSS (S3). In a case where the probe request is not modulated with the DSSS (No in S3), the setting unit 13 sets the number of times of retransmission of the probe response to the default value that is registered in advance (S4). For example, in the case of the wireless LAN system in compliance with IEEE 802.11, the dot11ShortRetryLimit value is set to 7 and the dot11LongRetryLimit value is set to 4. Then, the control unit 12 is notified that the setting of the number of times of retransmission of the probe response has completed. The control unit 12 transmits the probe responses according to the number of times of retransmission that is set (S5).

In a case where the probe request is modulated with the DSSS (Yes in S3), it is determined whether or not the channel information is included in a frame body of the probe request (S6). In a case where the channel information is not included, processing to S7 takes place and the number of times of retransmission of the probe response that is set to a value that is less than the default value. In a case where the channel information is included (Yes in S6), the setting unit 13 sets the number of times of retransmission of the probe response to the default value (S4). The control unit 12 transmits the probe response for the number of times of retransmission that has been set (S5).

In this manner, according to the present embodiment, based on various pieces of information (for example, a transmission destination SSID, a modulation method, and the channel information) associated with the probe request, the number of times of retransmission for the probe response is set to a value that is less than the default value, when there is a high probability that a probe response will be transmitted to the wireless communication terminal from another wireless access point, or when there is a low probability that the wireless communication terminal will receive the probe response even though transmitted by the wireless access point. Therefore, because transmission of probe responses that serve no purpose is reduced, there is more opportunity for data communication and the bandwidth utilization efficiency can thus be improved.

It is noted that the number of retransmissions may be made to be set to a value that varies according to details of the information associated with the probe request. For example, in a case where the SSID element is the wildcard SSID, the dot11ShortRetryLimit value may be set to 5, and the dot11LongRetryLimit value may be set to 3. When the probe request is modulated with the DSSS and the channel information is not included in the frame body, the dot11ShortRetryLimit value may be set to 3, and the dot11LongRetryLimit value may be set to 1.

Furthermore, in a case where the channel information is included in the frame body, but is not the channel that is used by the wireless access point, dot11ShortRetryLimit and dot11LongRetryLimit values may be both set to 0, and a frame response may be made not to be transmitted.

Second Embodiment

In the first embodiment, when there is a low probability that the wireless communication terminal that is the transmission source of the probe request will perform receive the probe response, the number of times that the probe response, which is transmitted from the wireless access point, is retransmitted is decreased and the transmission of probe responses that serve no purpose is reduced. Thus, the bandwidth utilization efficiency is improved.

In contrast, in the second embodiment, the probe response that is transmitted from the wireless access point is broadcast (as compared to unicast), and thus, with a one-time probe response, a plurality of wireless communication terminals are caused to recognize the presence of the access point. Accordingly, the transmission of the ACK frame from the wireless communication terminal in response to the probe response is made to be unnecessary, and the number of times that the probe request from the wireless communication terminal is transmitted is decreased. Thus the bandwidth utilization efficiency is improved.

Figure 3:
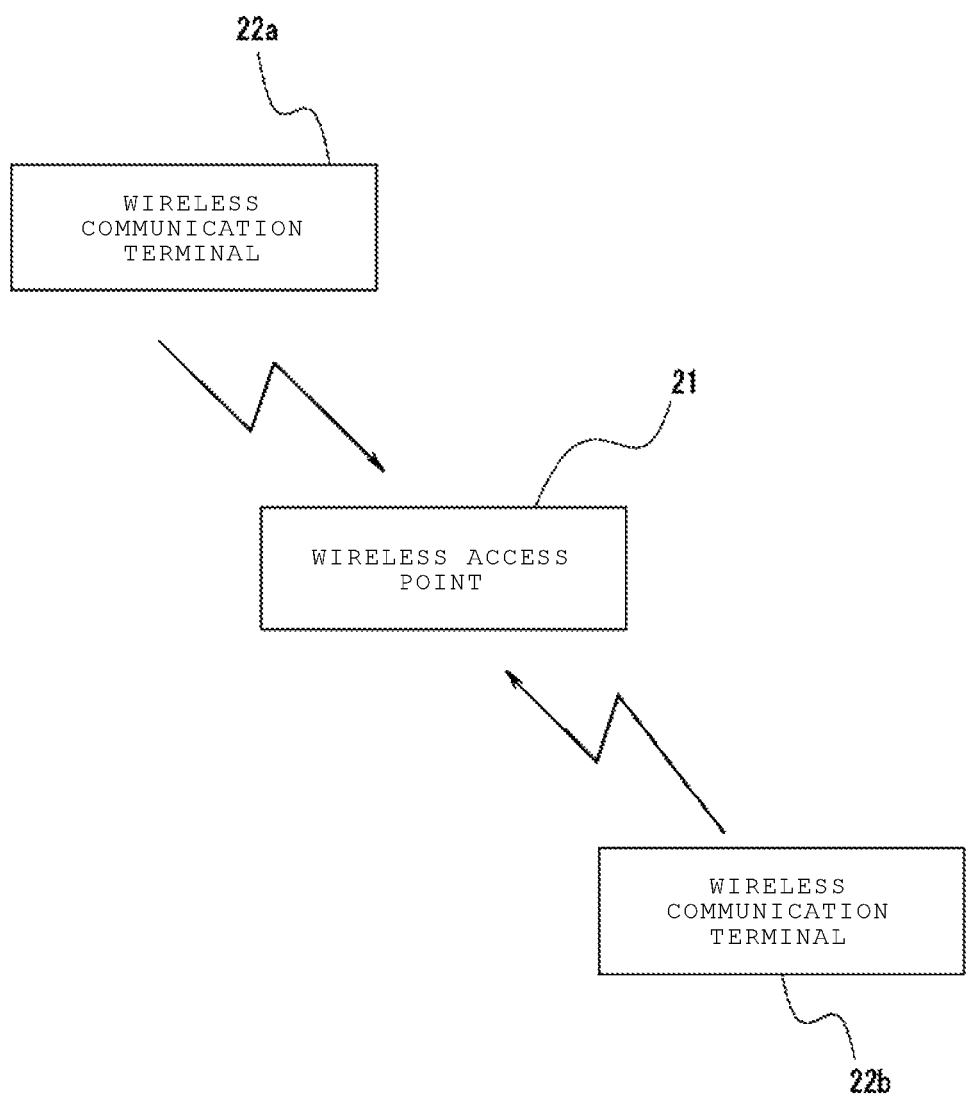
FIG. 3 is an overall diagram of a wireless communication system according to a second embodiment.

FIG. 3 is an overall diagram of a wireless communication system according to a second embodiment. A wireless access point 21 has a wireless communication interface, and performs wireless communication between wireless communication terminals 22a and 22b that are present in the wireless communication-available area. It is noted that the number of wireless communication terminals that are present in the wireless communication-available area is not limited to 2 and may be 3 or greater.

The wireless communication terminals 22a and 22b each have wireless communication interfaces, and for example, are notebook PCs, tablets, smartphones, or the like. It is noted that the wireless communication, for example, is realized by a wireless LAN that complies with standards such as IEEE 802.11.

Next, a sequence for the probe request and the probe response between the wireless access point 21 in the second embodiment and each of the wireless communication terminals 22a and 22b is described. FIG. 4 is a diagram for describing a communication sequence for the probe request and the response to the probe request in the second embodiment.

First, a probe request is transmitted from the wireless communication terminal 22a to the wireless access point 21 (S11). At this time, the wireless communication terminal 22a transmits frame data of a probe request, to which the information that the reception of the probe response as broadcast is also possible is added. For example, "OuiType" that is an information element, for which "AskProbeReqByBroadCast" is set, is transmitted.

Next, the wireless access point 21 interprets the frame data of the probe request that is received from the wireless communication terminal 22a, and transmits the probe response as broadcast (S12). Not only is the probe response received in the wireless communication terminal 22a, but also is received by another wireless communication terminal that is present within a wireless communication area, which monitors the same channel as the wireless communication terminal 22a. For example, in a case where the wireless communication terminal 22b monitors the same channel as the wireless communication terminal 22a, the probe response that is transmitted from the wireless access point 21 is received by the wireless communication terminal 22b as well.

In this manner, in a case where the wireless communication terminal 22b can receive the probe response sent in response to the probe request of the wireless communication terminal 22a, there is no need for the wireless communication terminal 22b to also transmit a probe request to the wireless access point 21. Furthermore, because the probe request is broadcast from the wireless access point 21, it is unnecessary for each of the wireless communication terminals 22a and 22b that receive the probe request to reply with ACKs. Therefore, because the number of times that the probe request or the ACK is transmitted is decreased, more opportunity for data communication can be provided and the bandwidth utilization efficiency can be improved.

FIG. 5 is a diagram for describing another example of the communication sequence for probe request and response to the probe request in the second embodiment. First, the wireless communication terminals 22a and 22b that are present in the wireless communication-available area that is covered by the wireless access point 21 synchronize channels on which probes are scanned, at a specific time that is set (S13). It is noted that clocks that the wireless communication terminals 22a and 22b retain are assumed to be in coincidence with each other.

As a method of keeping the clocks in coincidence with each other, for example, in a case where a beacon is transmitted periodically from the wireless access point 21, a method of including information on absolute time in the beacon can be used. The wireless communication terminals 22a and 22b that receive the beacons adjust their own clocks based on absolute time information that is included in the frame data. Furthermore, for example, the absolute time can be set to be in the information element of the frame data of the probe response that is transmitted from the wireless access point 21, and the wireless communication terminal 22 that receives the frame data may be made to adjust its own clock.

A mechanism which is such that the wireless communication terminals 22a and 22b automatically set channels is kept set in advance, based on time to which a channel is synchronized, using the fact that the clocks that the wireless communication terminals 22a and 22b retain are in coincidence with each other. For example, a mechanism in which a channel is obtained from the last-digit number in seconds of time, synchronization to which takes place, is kept set, and thus, although synchronization channel information is not given by other sources, the wireless communication terminals 22a and 22b can be set to the same channel. For example, in a case where a clock is synchronized to 12 hours: 34 minutes: 56 seconds, the wireless communication terminals 22a and 22b both set a channel for scanning to 6 ch.

Next, when standby time t1 and standby time t2 that are randomly set elapse from the time to which a channel is synchronized, the wireless communication terminals 22a and 22b transmit the probe requests to the wireless access point 21, respectively. In the case of an example that is illustrated in FIG. 5, because the standby time t1 for the wireless communication terminal 22a is set to be shorter than the standby time t2 for the wireless communication terminal 22b, after the standby time t1 elapses from the time to which the channel is synchronized, the probe request is transmitted from the wireless communication terminal 22a to the wireless access point 21 (S14).

At this time, the wireless communication terminal 22a transmits the frame data of the probe request, to which the information that the reception of the probe response as broadcast is also possible to be added. For example, "OuiType" that is the information element, for which "AskProbeReqByBroadCast" is set, is transmitted.

Next, the wireless access point 21 interprets the frame data of the probe request that is received from the wireless communication terminal 22a, and transmits the probe response by broadcast (S15). At this time, because the wireless communication terminal 22b monitors the same channel as the wireless communication terminal 22a, the probe response that is transmitted from the wireless access point 21 is received in the wireless communication terminal 22b as well.

In a case where the probe response is transmitted until the standby time t2 elapses after the channel synchronization, the wireless communication terminal 22b can recognize the presence of the wireless access point 21 without transmitting the probe request. Furthermore, because the probe response is transmitted by broadcast, the wireless communication terminals 22a and 22b do not both need to transmit the ACK. It is noted that in a case where the probe response to the probe request from the wireless communication terminal 22a is not transmitted until the standby time t2 elapses from the channel synchronization, after the standby time t2 elapses from the time to which the channel is synchronized, the wireless communication terminal 22b transmits the probe request.

In this manner, clocks of the wireless communication terminals 22a and 22b, which are present within the wireless communication-available area that is covered by the wireless access point 21, are kept in coincidence with each other and the channel on which the probe is scanned is caused to be synchronized according to the time. Thus, the probability that another wireless communication terminal 22b will receive and use the probe response to the probe request that is transmitted by another wireless communication terminal 22a, from the wireless access point 21 can be increased.

Furthermore, the time at which each of the wireless communication terminals 22a and 22b transmits the probe request is shifted, and thus more opportunity for using the probe response to the probe request that is transmitted from another wireless communication terminal, from the wireless access point 21, can be provided. Therefore, because the number of times that the probe request or the ACK is transmitted is decreased, more opportunity for the data communication can be provided and the bandwidth utilization efficiency can be improved.

It is noted that the mechanism for the channel synchronization or the method of causing the clocks of the wireless communication terminals 22a and 22b to be in coincidence with each other is not limited to the mechanism or the method that is described above, and another mechanism or method may be used. Furthermore, as described above, it is desirable that in all the wireless communication terminals that are present within the wireless communication-available area that is covered by the wireless access point 21, the channel synchronization is performed and the probe request is caused to be transmitted with a time difference. However, the channel synchronization may be performed in one or several of the wireless communication terminals rather than all.

Third Embodiment

Incidentally, when it comes to the wireless access point, in addition to a fixed wireless access point (hereinafter referred to as a fixed access point or a fixed AP) installed in a predetermined position, there is also a mobile wireless access point (hereinafter referred to as a mobile access point or a mobile AP) that is installed in a moveable object, such as a train or a vehicle or is carried by a human being or the like.

In a place where many people gather, such as a rail station or an event venue or site, in addition to many fixed APs being installed, there is a further tendency for the wireless access points to converge, such as when the train in which the mobile AP is installed arrives, or when a human being carrying a mobile router or the like comes and goes. Accordingly, there is a problem in that a frequency bandwidth that is used for a wireless LAN is considerably congested and thus a communication failure is caused.

Accordingly, in the third embodiment, the degree to which an access point search packet is sent out from the mobile AP according to a congestion situation of another wireless access point that is present in the vicinity, such as when the probe response or the beacon is sent out. Thus, the wireless communication system provides more opportunity for the data communication and improves the bandwidth utilization efficiency.

FIG. 6 is an overall diagram of a wireless communication system according to a third embodiment. FIG. 6 illustrates an example of a case where a mobile AP is brought into a place where many fixed APs are installed. Mobile APs 30a, 30b, and 30c are mobile wireless access points that each have a wireless communication interface, and perform wireless communication to/from wireless communication terminals (not illustrated) that are present in wireless communication-available areas 31a, 31b, and 31c, respectively. The mobile APs 30a, 30b, and 30c are installed in rolling stocks 300a, 300b, and 300c, respectively, of a train 300 that is a mobile object.

A fixed AP 40 is installed in a station 301. The fixed AP 40 is a wireless access point that has a wireless communication interface, and is connected to a fixed broadband line or the like. The fixed AP 40 performs wireless communication with a wireless communication terminal (not illustrated) that is present in a wireless communication-available area 41. It is noted that in addition to the fixed AP 40 particularly illustrated, there may be many other fixed APs (that are not specifically illustrated) but are present in the station 301.

It is noted that the train 300 runs in the left-to-right direction of the drawing and that as the station 301 is approached, an area increases where each of the wireless communication-available areas 31a, 31b, and 31c that are covered by the mobile APs 30a, 30b, and 30c, respectively, and the wireless communication-available area 41 that is covered by the fixed AP 40 overlap each other.

Figure 7:
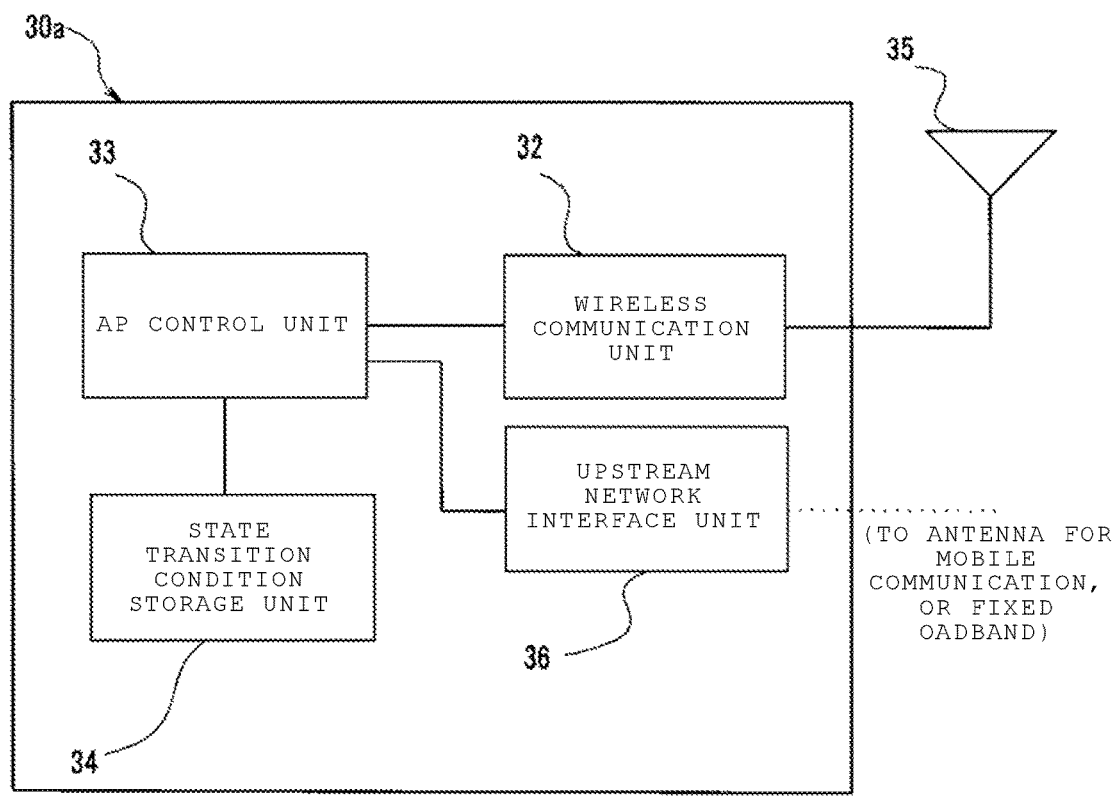
FIG. 7 is a schematic block diagram illustrating a configuration of a mobile AP.

FIG. 7 is a schematic block diagram illustrating a configuration of a mobile AP. The mobile AP 30a is configured primarily with a wireless communication unit 32, an AP control unit 33, a state transition condition storage unit 34, an antenna 35, and an upstream network interface unit 36.

The wireless communication unit 32 receives the data transmitted from a wireless communication terminal in the vicinity, or transmits data according to a data communication instruction from the AP control unit 33. Specifically, data that is transmitted with a sequence of processes (e.g., a probe request or response, a wireless authentication procedure, a connection approval procedure, an encryption key exchange, and the like) for establishing a wireless connection from the wireless communication terminal is received and a response is transmitted. After the wireless connection is established, data can be communicated at any time between the wireless access point and the wireless communication terminal. Furthermore, a beacon from another wireless access point that is present in the wireless communication-available area 31a can be received and the received beacon is notified to the AP control unit 33.

The AP control unit 33 manages a communication state of the mobile AP 30a and controls an entire operation of the mobile AP 30a based on information received from the wireless communication unit 32, a control program, and contents of a condition list stored in state transition condition storage unit 34.

Figure 8:
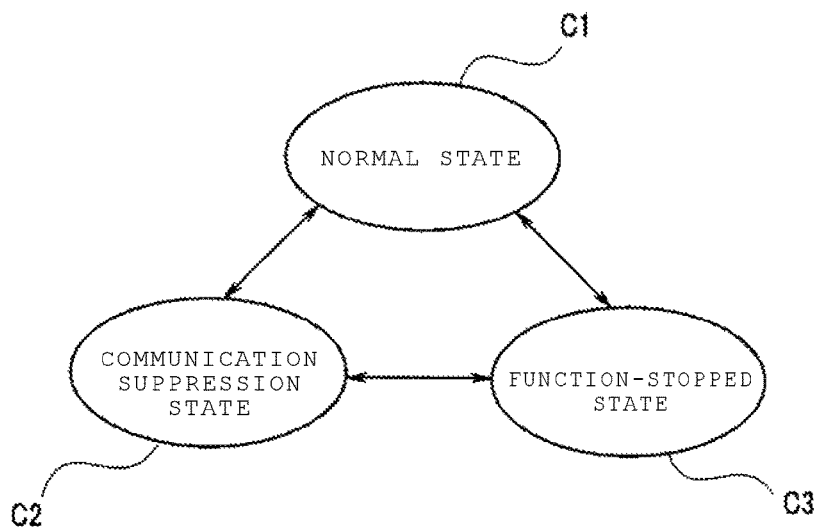
FIG. 8 is a state transition diagram of a wireless access point that is managed in an AP control unit.

FIG. 8 is a state transition diagram of the mobile AP 30a that is managed by the AP control unit 33. The mobile AP 30a is set to be in any one of three communication states, a normal state C1, a communication suppression state C2, and a function-stopped state C3.

The normal state C1 is a state in which normal communication (e.g., the beacon or the probe response) can be performed without any special limitation.

The communication suppression state C2 is a state in which the transmission of the beacon or the probe response, or other data communication with a wireless communication terminal is limited. Specifically, the transmission of the beacon is stopped in a stealth state, the transmission of the probe response is stopped, or an upper limit value of the number of times of retransmission of the probe response is set to a value that is less than in the normal state C1. Furthermore, a wireless communication terminal that was previously connected can maintain a connected state, but new connections may be prohibited. It is noted that an interval of the transmission of the beacon may be set to be short or a radio wave strength for the transmission of the beacon may be weakened without stopping the transmission of the beacon.

The function-stopped state C3 is a state in which the transmission of the beacon or the probe response, or the data transmission and reception is not performed. Specifically, in a case where the transmission of the beacon or the probe response is stopped and while a wireless communication terminal is still connected, the connection will be released. Furthermore, new connections to the wireless communication terminal are prohibited as well. However, it is assumed that with passive scan, it is possible that a beacon that is sent out from another AP can still be received.

The AP control unit 33 compares information about the one or more AP present in the vicinity, which is received from the wireless communication unit 32, with information that is registered in the state transition condition storage unit 34, and then sets communication state of the mobile AP 30a.

In the state transition condition storage unit 34, the information (e.g., a transition condition) that acts as a trigger for causing the communication state to transition and to which communication state the mobile AP 30a is caused to transition to in response to the transition condition are registered, for example, in the form of a list of transition conditions and corresponding transition state settings.

Figure 9:
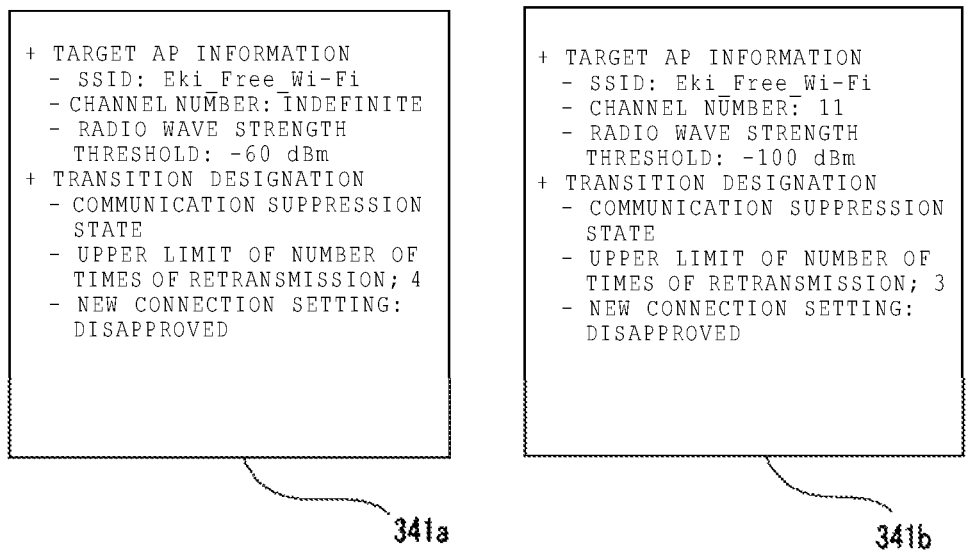
FIG. 9 is an example of lists registered in a state transition condition storage unit.

FIG. 9 is an example of the list that is registered in the state transition condition storage unit 34. In a case where a specific AP is detected, lists 341a and 341b are examples of a list in a case where the communication state is caused to transition.

For a specific AP that is in a transition condition, three items, an SSID (an ESSID or a BSSID) of an AP that is a target, a channel number of a detection target, and a threshold of the radio wave strength (e.g., a threshold of signal detection) are set. Furthermore, in addition to these items, a time range or the like that is a detection target may be added.

Furthermore, for a transition state setting, three items, a transition state (the communication suppression state C2 or the function-stopped state C3), the upper limit value of the number of times of retransmission of the probe response, and whether or not to a new connection to the wireless communication terminal is approved are set. It is noted that two items, the upper limit value of the number of times of retransmission of the probe response and whether or not a new connection to the wireless communication terminal is approved, are effective in a case where the communication suppression state C2 is set as the transition state. Furthermore, in addition to these, for example, whether or not the sending-out of the beacon is enabled (whether or not the mobile AP 30a itself is made to be in the stealth state), an interval of the sending-out of the beacon, the radio wave strength for the transmission of the beacon, and the like may be added.

In the list 341a, a transition condition is registered for a case that an AP having an SSID of Eki_Free_Wi-Fi, and a radio wave strength of −60 dBm or higher, is detected upon this transition condition being detected the mobile AP 30a causes itself to transition to the communication suppression state C2, and the number of times of retransmission of the probe response is set to 4, and a new connection to a wireless communication terminal is disapproved according the registered transition state setting. Furthermore, in the list 341b, a transition condition is registered for a case in which an AP having an SSID of Eki_Business_Wi-Fi, a channel number is 11, and a radio wave strength of −100 dBm or higher is detected. Upon this transition condition being detected, the mobile AP 30a causes itself to transition to the communication suppression state C2 in which the transition state settings are the number of times of retransmission of the probe response is set to 3, and a new connection to a wireless communication terminal is disapproved.

The upstream network interface unit 36 performs data communication by an antenna for mobile communication or by a fixed broadband connection or the like to a device that is installed upstream from the mobile AP 30a.

It is noted that configurations of the mobile APs 30b and 30c are the same as the configuration of the mobile AP 30a that is illustrated in FIG. 7.

Figure 10:
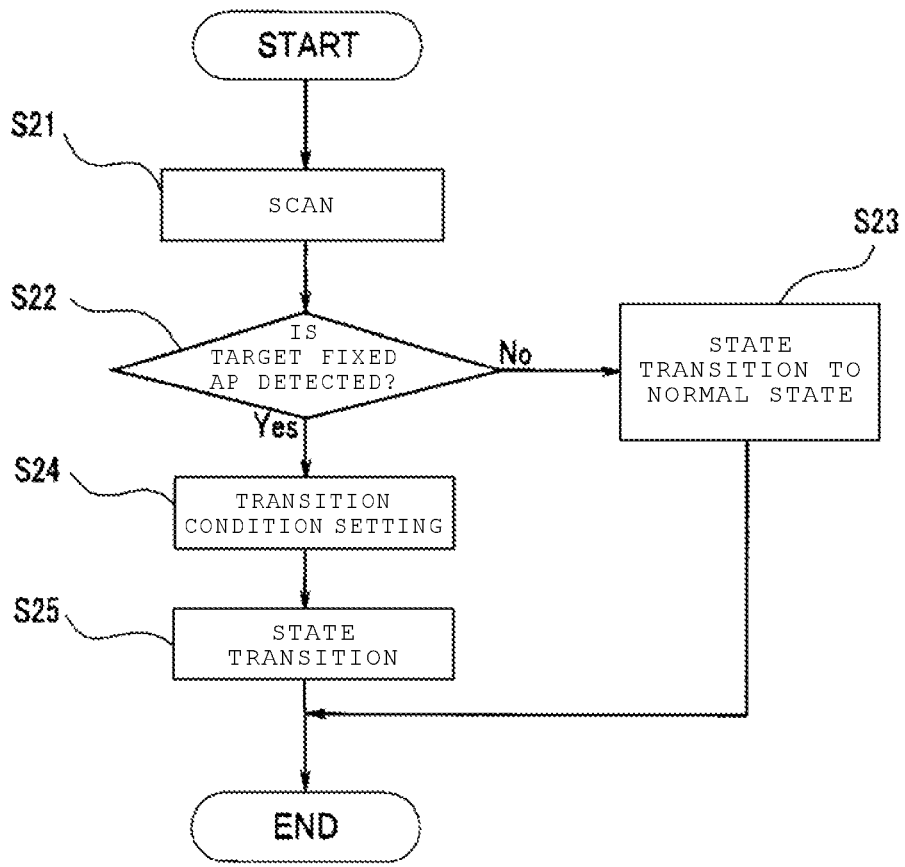
FIG. 10 is a flowchart for describing a procedure for causing a state of the wireless access point to transition.

Next, a procedure in which the communication state of the mobile AP 30a is set in the AP control unit 33 is described. FIG. 10 is a flowchart for describing a procedure for causing a state of a mobile AP to transition.

First, in the wireless communication unit 32, a passive scan is performed, and a beacon that is transmitted through the antenna 35 from a mobile or fixed AP in the vicinity is received (S21). The wireless communication unit 11 outputs data of the received beacon to the AP control unit 33.

Next, the AP control unit 33 compares the data of the beacon that is received from the wireless communication unit 32 to the information in the state transition condition storage unit 34. Specifically, it is determined whether or not the data of the beacon is in coincidence with a transition condition in the list stored in the state transition condition storage unit 34, that is, whether or not a fixed AP that is registered in the list is detected (S22). For example, in a case where two lists, the lists 341a and 341b, are registered in the state transition condition storage unit 34, if an AP having an SSID of Eki_Free_Wi-Fi and a radio wave strength of −60 dBm or higher, or an AP having an SSID of Eki_Business_Wi-Fi, a channel number of 11, and which has a radio wave strength of −100 dBm or higher is detected, it is determined that a target fixed AP has been detected.

In a case where the target fixed AP is not detected (No in S22), the communication state of the mobile AP 30a is caused to transition to the normal state C1 (S23), and state setting is ended.

On the other hand, in a case where the target fixed AP is detected (Yes in S22), the transition condition is set (S24). In a case where only one target fixed AP is detected, the transition condition is set according to the transition state in the list for the AP satisfying the transition condition. For example, in a case where an AP having an SSID of Eki_Free_Wi-Fi and a radio wave strength of −60 dBm or higher is detected, the transition state setting in the list 341a is the communication suppression state C2, the number of times of retransmission of the probe response is 4, and a new connection to the wireless communication terminal is disapproved.

In a case where two or more the target fixed APs are detected, items in transition state setting can be compared with each other and a more stringent restriction/setting can be employed. Specifically, when it comes to the communication state, the function-stopped state C3 has a more stringent restriction than the communication suppression state C2. Furthermore, when it comes to the number of times of retransmission of the probe response, the smaller number is a more stringent restriction. Additionally, when it comes to a setting of a new connection of the wireless communication terminal, disapproval is a more stringent restriction than approval.

For example, in a case where an AP of which an SSID is Eki_Free_Wi-Fi and which has a radio wave strength of −60 dBm or higher (see list 341a), and an AP of which an SSID is Eki_Business_Wi-Fi, of which a channel number is 11, and which is a radio wave strength of −100 dBm or higher (see list 341b), are both detected, the communication suppression state C2 is set, the number of times of retransmission of the probe response is 3, and a new connection to the wireless communication terminal is disapproved.

Last, the communication state of the mobile AP 30a is caused to transition according to the transition condition that is set (S25), and setting is ended.

In this manner, when a fixed AP is installed in a place where many people gather, such as the fixed AP 40 that is installed in a station, is registered in the state transition condition storage unit 34 and this fixed AP is then detected by scanning, the communication states of the mobile APs 30a, 30b, and 30c can be switched to the communication suppression state C2 or the function-stopped state C3. Therefore, because the sending-out of the access point search packet, such as the sending-out of the probe response or the beacon, is suppressed, more opportunity for the data communication can be provided and the bandwidth utilization efficiency can be improved.

Furthermore, when the fixed AP 40 is not detected, the communication states of the mobile APs 30a, 30b, and 30c are automatically switched to the normal state C1. Therefore, in a case where a place is at a distance away from the place where many people gather and there is no need for communication restriction in such a place, because the sending-out of the probe response or the beacon is performed as usual, it is easy for the wireless communication terminal in the vicinity to be connected to the mobile APs 30a, 30b, and 30c and a satisfactory communication environment can be maintained.

It is noted that in the example described above, in a case whether a specific AP (the fixed AP) is detected, setting is performed in such a manner that the communication state is made to transition, but in a case where APs of which the number is equal to or greater than a certain number, setting may also be performed in such a manner that the communication state is made to transition.

Figures 11, 12:
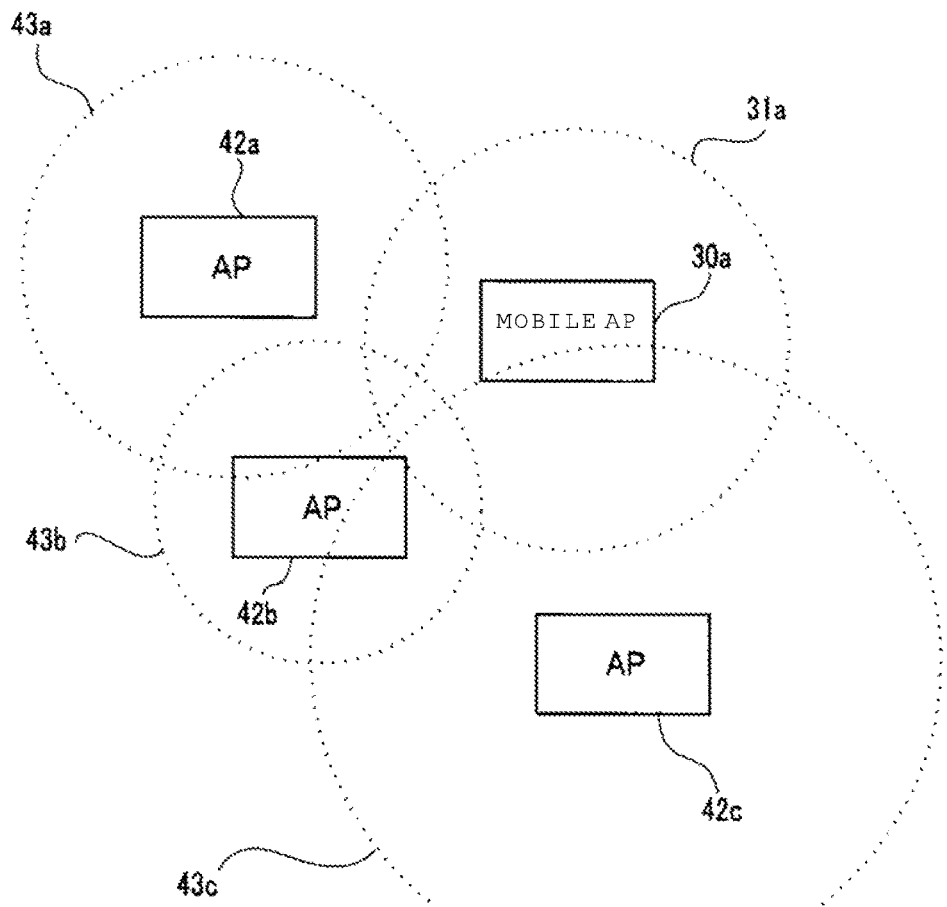
FIG. 11 is an overall diagram of another wireless communication system according to the third embodiment.
FIG. 12 is an example of a list that is registered in the state transition condition storage unit.

FIG. 11 is an overall diagram of a wireless communication system according to a third embodiment. FIG. 11 illustrates an example of a case where a mobile AP is brought into a place where many APs (fixed APs or other mobile APs) are present. In this case, the wireless communication-available area 31a that is covered by the mobile AP 30a and each of the wireless communication-available areas 43a, 43b, and 43c that are covered by APs 42a, 42b, and 42c, respectively, overlap and the probability is increased that a frequency bandwidth that is used for the wireless LAN will be considerably congested and a communication failure will be caused. In such a case, the total number of APs that are detected is kept registered as a transition condition in the state transition condition storage unit 34, and thus, although the names (e.g., SSIDs) of the APs in the vicinity may be indefinite, the communication state can be switched to the communication suppression state C2 or the function-stopped state C3 according to the detected total number of APs in the vicinity.

FIG. 12 is an example of the list that is registered in the state transition condition storage unit 34. A list 341c is an example of the list in a case where the communication state is caused to transition in a case where the APs in the vicinity, of which the number is greater than a predetermined number, are detected. In the list 341c, a condition is registered that, in a case where three or more APs each of which uses the same channel as the mobile AP 30a itself and each of which has a radio wave strength of −60 dBm or higher are detected (=transition condition), setting is performed in such a manner that the mobile AP 30a itself is caused to transition to the communication suppression state C2, that the number of times of retransmission of the probe response is set to 3, and that a new connection to the wireless communication terminal is disapproved.

It is noted that in a case where the transition condition described above continues for a certain time or more, and thus is satisfied, a change to the state that is registered in the transition state setting may be made to take place. Furthermore, in addition to these states, other parameters, such as whether or not the sending-out of the beacon is enabled (whether or not the mobile AP 30a itself is made to be in the stealth state), an interval of the sending-out of the beacon, the radio wave strength for transmission of the beacon, and the like may be added.

Next, the procedure in which the communication state of the mobile AP 30a is set in the AP control unit 33 is described. FIG. 13 is a flowchart for describing a procedure for causing the state of the mobile AP to transition.

First, in the wireless communication unit 32, a passive scan is performed to detect, through the antenna 35, the beacon (s) from any other AP in the vicinity (S26). The wireless communication unit 11 outputs data on any received beacon(s) to the AP control unit 33.

Next, the AP control unit 33 determines whether or not a beacon of another AP has been received from the wireless communication unit 32 (S27). In a case where it is determined that the data of the beacon has not been transmitted, that is, another AP has not been detected (No in S27), the communication state of the mobile AP 30a is caused to transition to the normal state C1 (S28) and setting is ended.

On the other hand, in a case where it is determined that another AP has been detected (Yes in S27), the AP control unit 33 compares the data of the beacon that has been received from the wireless communication unit 32, with the information that is registered in the state transition condition storage unit 34. Specifically, it is determined whether or not the data of the beacon is in coincidence with the transition condition in the list registered in the state transition condition storage unit 34, that is, whether APs of which the number is registered in the list has been detected (S29). For example, in a case where the list 341c (see FIG. 12) is registered in the state transition condition storage unit 34, it is determined that the same channel as that which is used in the mobile AP 30a itself is being used, and in a case where three or more APs, each of which has a radio wave strength of −80 dBm or higher, are detected, it is determined that the coincidence with the transition condition takes place.

In a case where APs that satisfy a predetermined condition, of which the number is not less than a number designated are not detected (No in S29), the communication state of the mobile AP 30a is caused to transition to the normal state C1 (S28) and setting is ended.

On the other hand, in a case where the number of detected APs that satisfy a predetermined condition is equal to or greater than a designated number (Yes in S29), the communication state of the mobile AP 30a is caused to transition according to the transition condition in the list 341c (S30) and setting is ended. For example, in the case of the list 341c, setting is performed in such a manner that the communication state is the communication suppression state C2, that the number of times of retransmission of the probe response is 3, and that a new connection to the wireless communication terminal is disapproved.

In this manner, the number of APs that are detectably present in the vicinity is registered as the transition condition, and thus although the presence of no other specific AP is registered, the communication state of the mobile AP 30a can be switched to the communication suppression state C2 or the function-stopped state C3 according to the detected number of other APs. Therefore, because the sending-out of the access point search packet, such as the sending-out of the probe response or the beacon, is suppressed, more opportunity for the data communication can be provided and the bandwidth utilization efficiency can be improved.

It is noted that in the example described above, in the communication suppression state C2, the frequency of the sending-out of the beacon or the radio wave strength for the transmission, the number of times of retransmission of the probe response, and the disapproval of a new connection to the wireless communication terminal are set, and thus an amount of data in an area with overlapping APs is reduced. Directions of the radio wave that is transmitted from the mobile AP 30a itself can be narrowed down to a direction corresponding to the wireless communication terminal to which the mobile AP 30a is connected, and the overlap with another AP can be reduced, and thus further congestion alleviation can be achieved.

FIG. 14 is an example of the list that can be registered in the state transition condition storage unit 34. In a list 341c', a condition that causes the mobile AP 30a to transition to the communication suppression state C2 set the number of times of retransmission of the probe response to 3, disapprove a new connection to a wireless communication terminal, and limit the transmission direction are listed. The transmission direction in this case is the known direction of a wireless communication terminal that was previously connected to the mobile AP 30a. The detected conditions that cause the mobile AP30a to apply the transitions listed list 341c' (FIG. 14) are the same detected conditions as listed in list 341c (FIG. 12).

Figure 15:
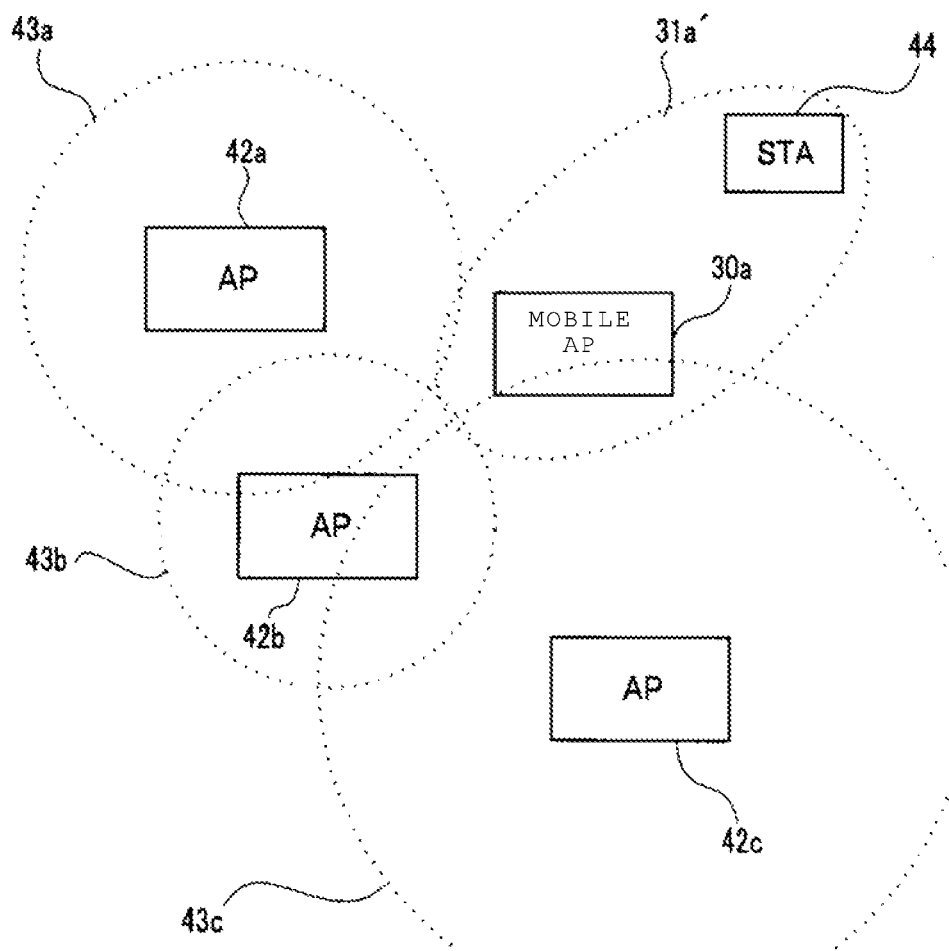
FIG. 15 is an overall diagram of still another wireless communication system according to the third embodiment.

FIG. 15 is an overall diagram of still another wireless communication system according to the third embodiment. In FIG. 15, a wireless communication terminal 44 is connected to the mobile AP 30a, a wireless communication-available area 31a' in a case where according to the list 341c', the state of the mobile AP 30a is caused to transition and the transmission direction of the radio wave is limited is illustrated.

In this manner, the transmission directions of the radio wave of the mobile AP 30a are narrowed down to the direction of the wireless communication terminal 44, and thus an area where each of the wireless communication-available areas 43a, 43b, and 43c that are covered by other APs 42a, 42b, and 42c, respectively, and the wireless communication-available area 31a' that is covered by the mobile AP 30a itself overlap each other can be reduced. Therefore, in the same area, because the sending-out of the access point search packet, such as the sending-out of the probe response or the beacon, is suppressed, more opportunity for the data communication can be provided, and the bandwidth utilization efficiency can be improved.

It is noted that as a method of narrowing down the transmission directions of the radio waves from the mobile AP 30a to the direction of the wireless communication terminal 44, a technology that uses a digital assistant antenna or the like, which is generally referred to as beamforming, can be used. However, no limitation to this technology is imposed, and another method may be used. Furthermore, not only may the transmission directions be narrowed down, but also space-time block coding (STBC) may be used. Thus, quality of a reception signal may be increased.

Both a specific AP and the total number of APs that are present in the vicinity can also be registered as a transition condition (or conditions) in the state transition condition storage unit 34. For example, three lists, the lists 341a, 341b, and 341c, can be registered in the state transition condition storage unit 34, and thus when any one of the three lists has a transition condition that is satisfied, then the communication state of the mobile AP 30a can be caused to transition accordingly. In this instance, the lists 341a and 341b, which are illustrated in FIG. 9, have the detection of a specific AP set as a transition condition. The list 341c, which is illustrated in FIG. 12, has a total number of AP that are present in the vicinity set as a transition condition.

Figure 16:
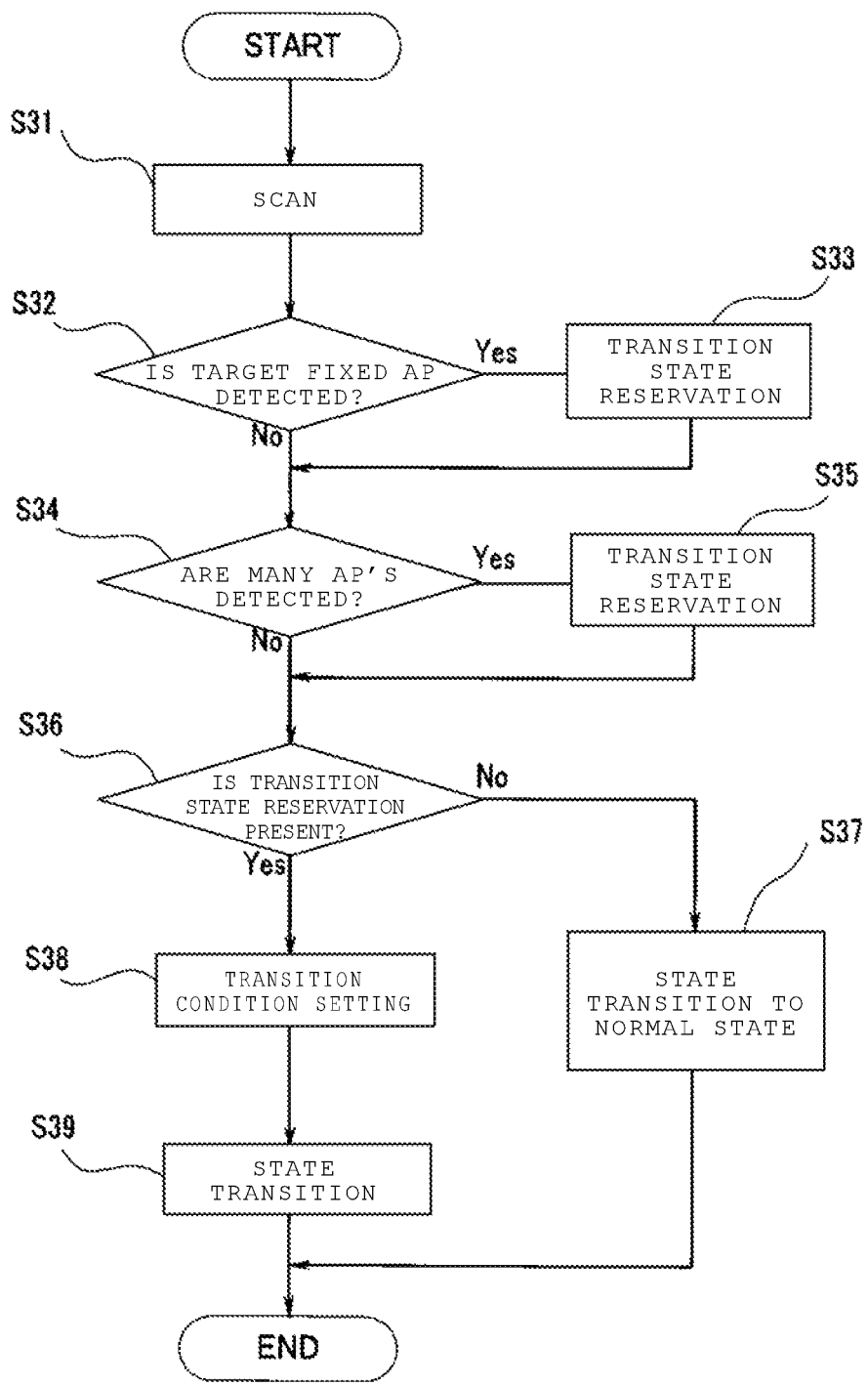
FIG. 16 is a flowchart for describing the procedure for causing the state of the wireless access point to transition.

FIG. 16 is a flowchart for describing a procedure for causing a state of the wireless access point to transition. A procedure when both a specific AP and a total number of APs present in the vicinity are registered as transition conditions is illustrated. A procedure when the lists 341a, 341b, and 341c are registered in the state transition condition storage unit 34 will be described below.

First, in the wireless communication unit 32, a passive scan is performed, and a beacon transmitted through the antenna 35 from a mobile or fixed AP in the vicinity is received (S31). The wireless communication unit 11 outputs the data of the received beacon to the AP control unit 33.

Next, the AP control unit 33 determines whether or not a fixed AP registered in the lists 341a and 341b is present in the data of the received beacon (S32). Specifically, when an AP having a specific SSID ("Eki_Free_Wi-Fi") and a radio wave strength of −60 dBm or higher, or an AP having another specific SSID ("Eki_Business_Wi-Fi"), a channel number of 11, and a radio wave strength of −100 dBm is detected, it is determined that a target fixed AP has been detected.

In a case where it is determined that a fixed AP which has been registered in the list has been detected (Yes in S32), the corresponding transition condition in the list is set as a transition state reservation (S33). In the case where only one target fixed AP has been detected, the transition state reservation is set according to the transition state of the corresponding list. For example, in a case where a detected AP has SSID "Eki_Free_Wi-Fi" and a radio wave strength of −60 dBm or higher, the transition condition stated in list 341a is that the communication state transitions to the communication suppression state C2, the number of times of retransmission of the probe response is set to 4, and new connections are disapproved.

In the case where two or more target fixed APs are detected, the lists in which detection of these targeted fixed APs are listed a transition condition are compared, and the more stringent listed restriction is employed.

When the setting of the transition state reservation is ended in S33, it is determined whether or not APs registered in the list 341c have been detected (S34). It is noted that even in a case where it has been determined in S32 that no fixed AP registered in the lists 341a or 341b has been detected (No in S32), the process proceeds to S34. In a case where the detected number of APs satisfies a predetermined condition, such as the detected number is equal to or greater than a number designated in the list 341c, (Yes in S34), the transition condition in the list 341c is set as the transition state reservation (S35). For example, according to the list 341c, the communication state is set to the communication suppression state C2, the number of times of retransmission of the probe response is set to 3, and new connections are disapproved.

Next, the presence or absence of the transition state reservation is determined (S36). It is noted that even in a case where it is determined in S34 that the number of detected APs satisfy a predetermined condition that is registered in the list 341c, (No in S34), the process proceeds to S36. In a case where the transition state reservation is not present (No in S36), the communication state of the mobile AP 30a itself is caused to transition to the normal state C1 (S37), and parameter setting is ended.

On the other hand, in a case where the transition state reservation is present (Yes in S36), the transition condition is set (S38). When transition state reservation has been set in only one of S33 or S35, the communication state of the mobile AP 30a is then caused to transition according to details of the settings of the transition state reservation (S39), and parameter setting is ended. However, when transition state reservation setting has been performed in both of S33 and S35, the items for the transition state reservation are compared with each other, and the more stringent restriction is selected as the transition condition. Then, the communication state of the mobile AP 30a is caused to transition according to the details of the setting of the transition state reservation (S39), and parameter setting is ended.

In this manner, both of a specific AP and the total number of APs that are present in the vicinity can be registered as a transition condition, and thus the communication state of the mobile AP 30a can be switched to the communication suppression state C2 or the function-stopped state C3 under the more stringent condition. Therefore, because the degree to which the access point search packet is sent out, such as when the probe response or the beacon is sent out, is further suppressed, more opportunity for the data communication can be provided and the bandwidth utilization efficiency can be improved.

Last, a modification example of the present embodiment is described. In the wireless communication system described above, when a situation coinciding with a listed transition condition occurs, the communication state of the mobile AP 30a is switched to the communication suppression state C2. In contrast, in this modification example, the communication state of the mobile AP 30a is instead switched to the function-stopped state C3, and the connection to the wireless communication terminal(s) is released.

Figure 17:
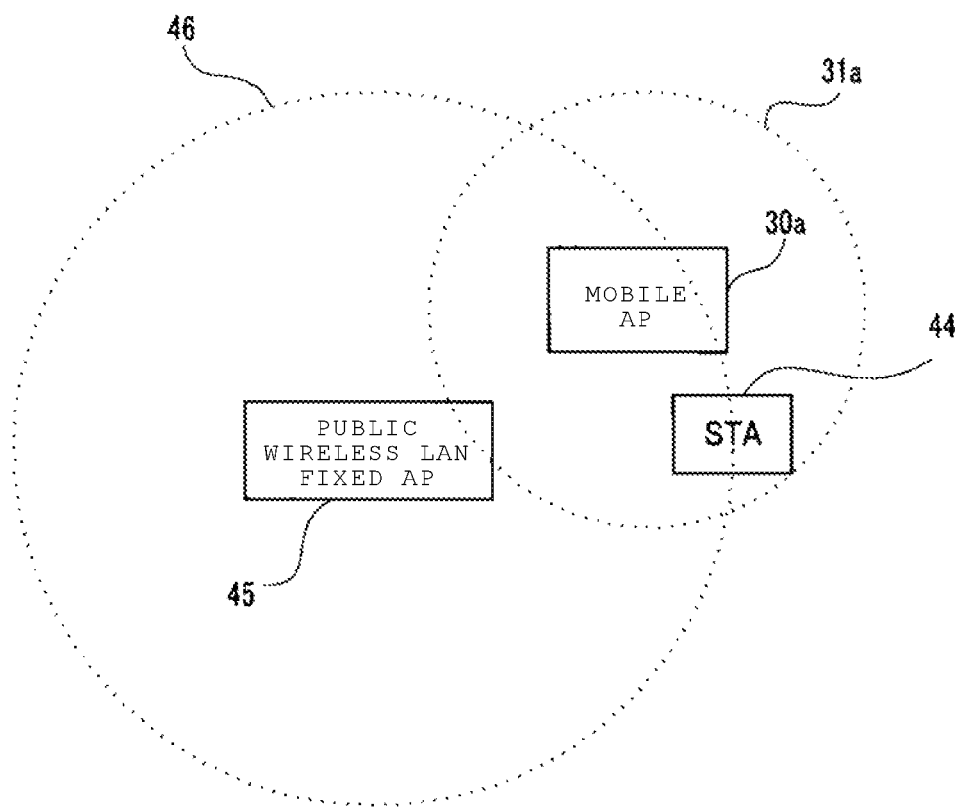
FIG. 17 is an overall diagram of a modification example of the wireless communication system according to the third embodiment.

FIG. 17 is an overall diagram of the modification example of the wireless communication system according to a third embodiment. For example, a case where a user uses a mobile router that connects to a broadband circuit for mobile communication is equivalent to the wireless communication system in FIG. 17. That is, here the mobile AP 30a is a mobile router that has a function of the wireless LAN and a function of a mobile communication broadband service. The wireless communication terminal 44 is, for example, a notebook PC that makes a connection to the mobile AP 30a for using the Internet or the like. It is also possible that the wireless communication terminal 44 is connected to a public wireless LAN. It is possible that higher speed communication is possible with the public wireless LAN than via the wireless LAN operating through the mobile AP 30a. Therefore, it is preferable that when the wireless communication terminal 44 enters a wireless communication-available area 46 covered by public wireless LAN fixed AP 45, the connection to the mobile AP 30a be released and a connection to the public wireless LAN fixed AP 45 be made so as to use of the public wireless LAN.

Furthermore, in a place where a public wireless LAN is present, in a case where the wireless LAN is used in the mobile AP 30a, if frequencies in use for the wireless LAN overlap each other, there is a probability that mutual communication will result in failure due to mutual interference.

Accordingly, in such a case, when the mobile AP 30a detects the public wireless LAN fixed AP 45, a setting is performed in such a manner that the communication state of the mobile AP 30a itself is switched to the function-stopped state C3, the connection of the wireless communication terminal 44 is released, and the wireless communication terminal 44 switches to a connection to the public wireless LAN fixed AP 45 and performs the wireless communication through the public wireless LAN.

Figure 18:
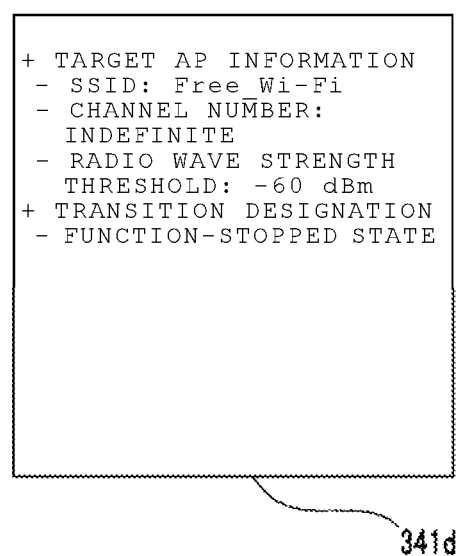
FIG. 18 is an example of a list that is registered in the state transition condition storage unit.

FIG. 18 is an example of the list that is registered in the state transition condition storage unit 34. In a list 341d, a condition is registered that when an AP for a public wireless LAN (e.g., public wireless LAN fixed AP 45) that has a radio wave strength of −60 dBm or higher is detected with SSID "Free_Wi-Fi" or other indication that the wireless communication terminal 44 is able to make a connection), the mobile AP 30a is caused to transition to the function-stopped state C3. It is noted that in the function-stopped state C3, the connection of the wireless communication terminal 44 to the mobile AP 30a is released and a new connection is disapproved.

In this manner, an AP (e.g., the public wireless LAN fixed AP 45 in FIG. 17) is registered as satisfying the transition condition, the transition state setting is set as the function-stopped state C3, and thus when the mobile AP 30a detects entry into the wireless communication-available area 46, the communication state of the mobile AP 30a can be automatically switched to the function-stopped state C3. The connection to the mobile AP 30a is released, the wireless communication terminal 44 detects the public wireless LAN fixed AP 45 and makes a connection to this now available network. Because of this, a more suitable communication environment is obtained. Furthermore, when the wireless communication-available areas 31a and 46 overlap each other, because the sending-out of the access point search packet is stopped, such as the sending-out of the probe response or the beacon by the mobile AP 30a, a communication failure due to radio wave interference can be prevented.

It is noted that in the function-stopped state C3, setting may be performed in such a manner that a beacon transmission interval is increased or the radio wave strength for the transmission is weakened rather than completely stopping the transmission of the beacon.

Fourth Embodiment

Due to a recent rapid increase in the number of foreign residents in Japan or the like, a free-of-charge wireless Internet connection service has to be provided promptly. However, because the provision of the free-of-charge wireless Internet service costs money, there is a situation where the free-of-charge wireless Internet is not yet available except in a limited operator or place. For this reason, there is a problem of establishing a business model for decreasing the operating cost or recovering the operating cost.

Furthermore, when the free-of-charge wireless Internet connection service is provided to unspecified users without any limitation, there is a problem in that a frequency band that is used for the wireless LAN is considerably congested and communication failure can be caused.

Accordingly, according to the fourth embodiment, there is provided a wireless communication system that is capable of decreasing operating cost or providing more opportunity for cost recovery and alleviating congestion of an in-use bandwidth and causing the utilization efficiency to be increased by controlling the users who are allowed to make a connection to the free-of-charge wireless Internet and also the length of time for which a connection to the free-of-charge wireless Internet may be available.

Figure 19:
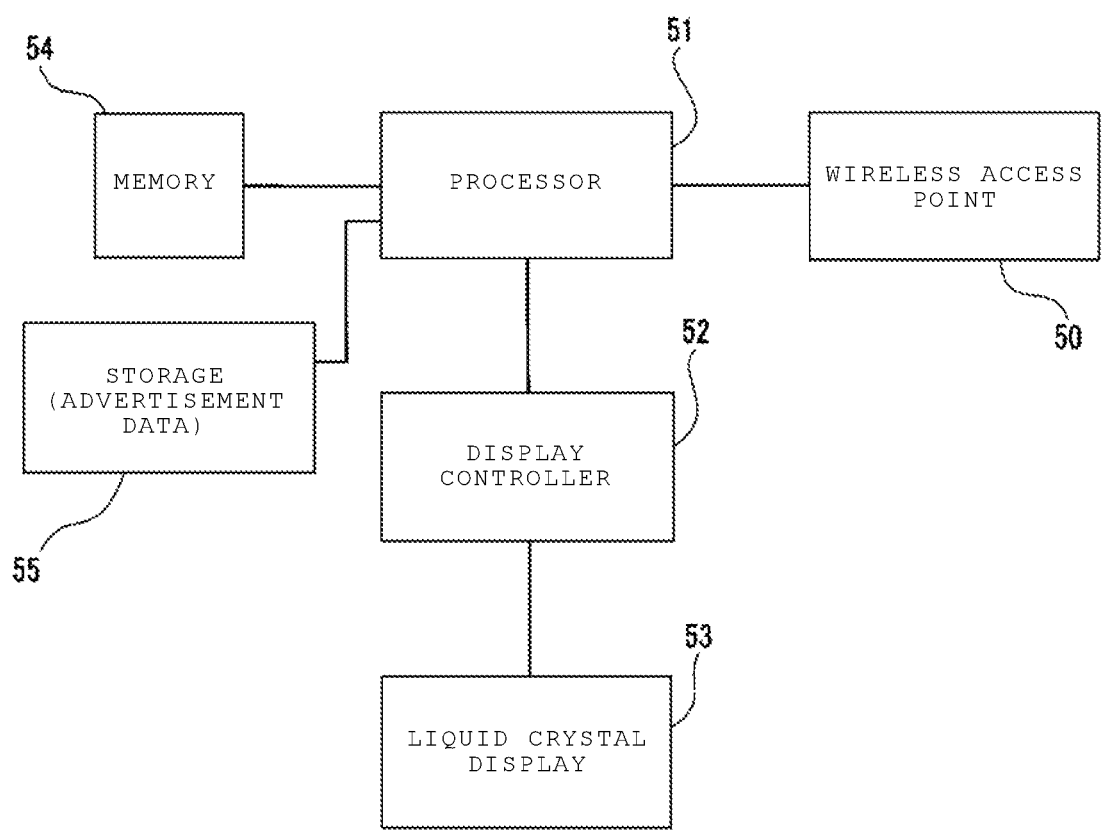
FIG. 19 is an overall diagram of a wireless communication system according to a fourth embodiment.

FIG. 19 is an overall diagram of a wireless communication system according to a fourth embodiment. FIG. 19 illustrates an example of a wireless communication system that results from combining a digital signage and a wireless access point that can be connected free of charge by any one.

The wireless communication system according to the fourth embodiment includes a wireless access point 50, a processor 51, a display controller 52, a liquid crystal display 53, a memory 54, and a storage 55.

The wireless access point 50 is a fixed access point with a wireless communication interface that performs wireless communication with wireless communication terminals (not illustrated) in a wireless communication area. The wireless access point 50 is connected in a fixed broadband, for example. Therefore, the wireless communication terminal(s) make a connection to a fixed broadband connection through the wireless access point 50 and are thus be able to use the Internet or the like.

The processor 51 controls an authentication operation and a probe request or a response operation by the wireless access point 50. Furthermore, the processor 51 is equipped with an OS, such as Linux®), and is equipped with an operation display function for causing an advertisement to be displayed or an HTML 5 rendering function for displaying the advertisement. By performing the program, the display controller 52 is instructed to display content on the liquid crystal display 53.

The display controller 52 displays predetermined content on the liquid crystal display 53 for a predetermined time according to an instruction of the processor 51. Content that is input from the display controller 52 is displayed on the liquid crystal display 53.

Various setting values, or the like, that are used in a program that is executed by the processor 51, are registered in the memory 54.

Content that is to be displayed on the liquid crystal display 53 can be stored in the storage 55. That is, advertisement data and tutorial data (for describing a method for connecting the wireless communication terminal to the wireless access point 50) are stored.

Figure 20:
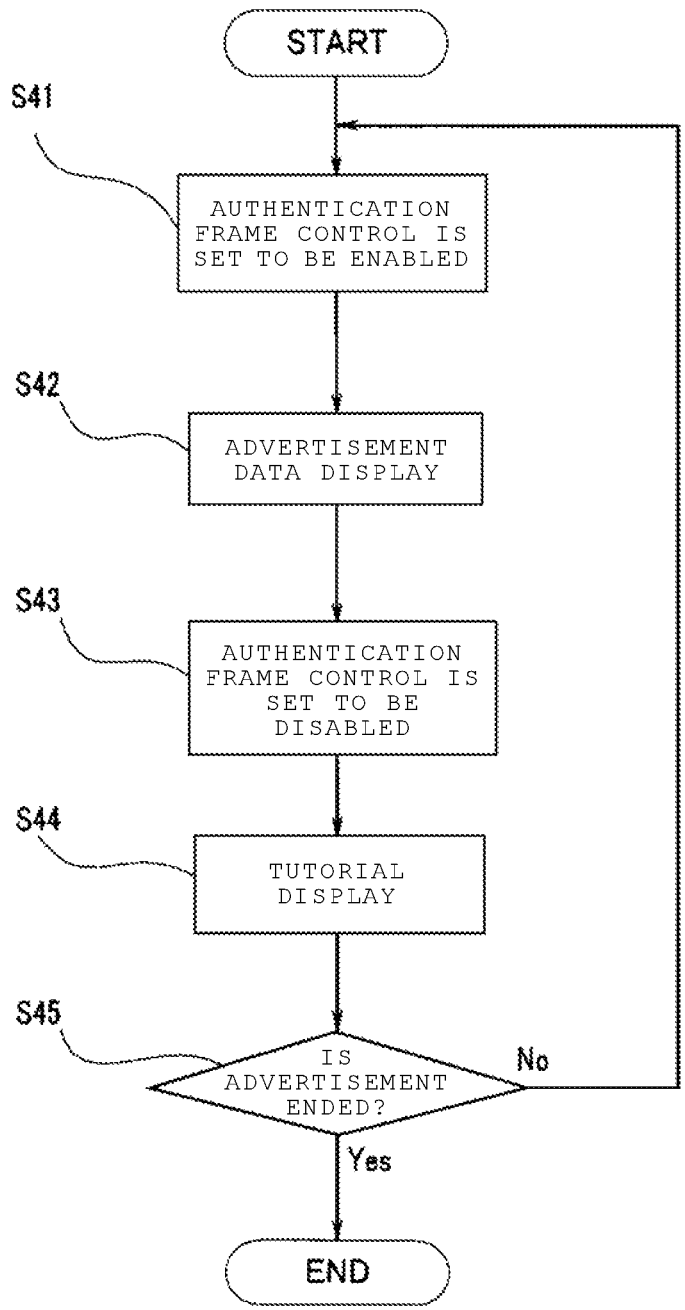
FIG. 20 is a flowchart for describing a procedure by which a processor operates.

Next, a method of controlling the wireless access point 50 and the display controller 52 by the processor 51 is described. FIG. 20 is a flowchart for describing a procedure in which the processor 51 operates.

When the wireless communication system is activated, first, the processor 51 instructs the wireless access point 50 to enables authentication frame control (S41). It is noted that when the authentication frame control is enabled, an operation of communicating an authentication frame between the wireless access point 50 and the wireless communication terminal is suppressed. The specific method used for the suppression may be varied on the wireless access point 50 side depending on type of device (s) being used for the wireless access point 50 or the wireless communication terminal. Next, predetermined advertisement data is extracted from the storage 55, and the display controller 52 is instructed to display the extracted data to be displayed on the liquid crystal display 53 (S42).

When a predetermined time elapses, the wireless access point 50 is instructed to disable the authentication frame control (S43). That is, the wireless access point 50 returns to a normal state. Subsequently, the tutorial data (an image or image data for describing the method of connecting the wireless communication terminal to the wireless access point 50) is extracted from the storage 55, and the display controller 52 is instructed to display the tutorial data on the liquid crystal display 53 (S44). It is noted that the procedure in S44 can be executed without any delay subsequent to the procedure in S43.

When a predetermined time elapses from the instruction to display to the tutorial data, it is determined whether or not to display a next advertisement (S45). In a case where the next advertisement to be displayed is present (Yes in S45), the procedures from S41 to S44 are repeated. On the other hand, in a case where the next advertisement to be displayed is not present (No in S45), a control operation by the processor 51 is ended.

Figure 21:
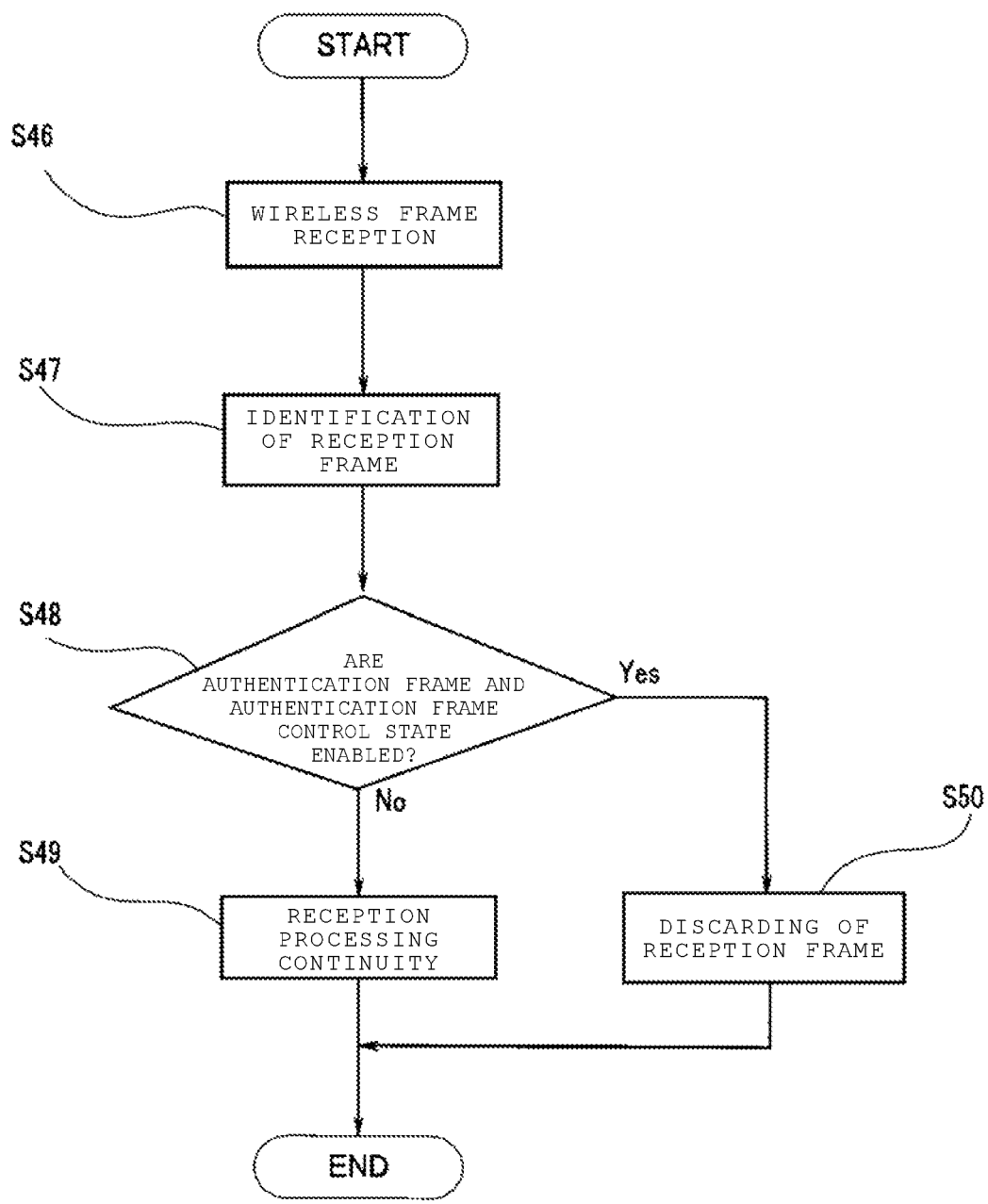
FIG. 21 is a flowchart for describing a frame reception operation in the wireless access point.

Next, a frame reception operation in the wireless access point 50 is described. FIG. 21 is a flowchart for describing a frame reception operation in the wireless access point. First, a data frame is received in a wireless manner from another wireless communication terminal (S46). Next, a type of the received frame is identified (S47). In a case where the type of the frame that is identified in S47 is an authentication frame (an association request or the probe request), it is further determined whether or not the authentication frame control is enabled according to the instruction from the processor 51 (S48).

In a case where the received frame is the authentication frame and where the authentication frame control is enabled (Yes in S48), the received authentication frame is discarded (S50), and the reception operation is ended. On the other hand, in a case where the received frame is a frame other than the authentication frame, such as the data frame, or in a case where the authentication frame control is disabled (No in S48), processing of the received frame is continued (S49).

In this manner, the wireless communication system according to the fourth embodiment displays the tutorial data after displaying the advertisement data on the liquid crystal display 53 only for a certain time. Then, when the tutorial data has been displayed for a certain time, the advertisement data is further displayed. While the advertisement data is being displayed on the liquid crystal display 53, a new connection of the wireless communication terminal to the wireless access point 50 is set to be disapproved and while the tutorial data is being displayed, a new connection is approved. Therefore, because the user makes a wireless connection only after viewing the advertisement, an advertisement impact can be improved and the cost of providing the free-of-charge Internet connection service can be recovered.

Furthermore, a new connection is limited for the period of time for which the advertisement data is being displayed, and the wireless access point 50 is set in such a manner not to receive an association request or the probe request. Therefore, because an association response or the probe response is not transmitted from the wireless access point 50 during this time, the congestion in the in-use bandwidth can be alleviated and the utilization efficiency can be improved.

Additionally, though new connections are limited/prevented for the period of time for which the advertisement data is being displayed, the connection of wireless communication terminals already connected to the wireless access point 50 are maintained during this time. Therefore, existing user convenience is secured.

It is noted that in the example described above, it is controlled whether or not the association request or the probe request in the wireless access point 50 is received with the switching between enabling and disabling of the authentication frame control, but operation of the wireless access point 50 may be similarly controlled by adjustment of transmission power for the association response or the probe response to control the wireless communication-available area.

Figure 22:
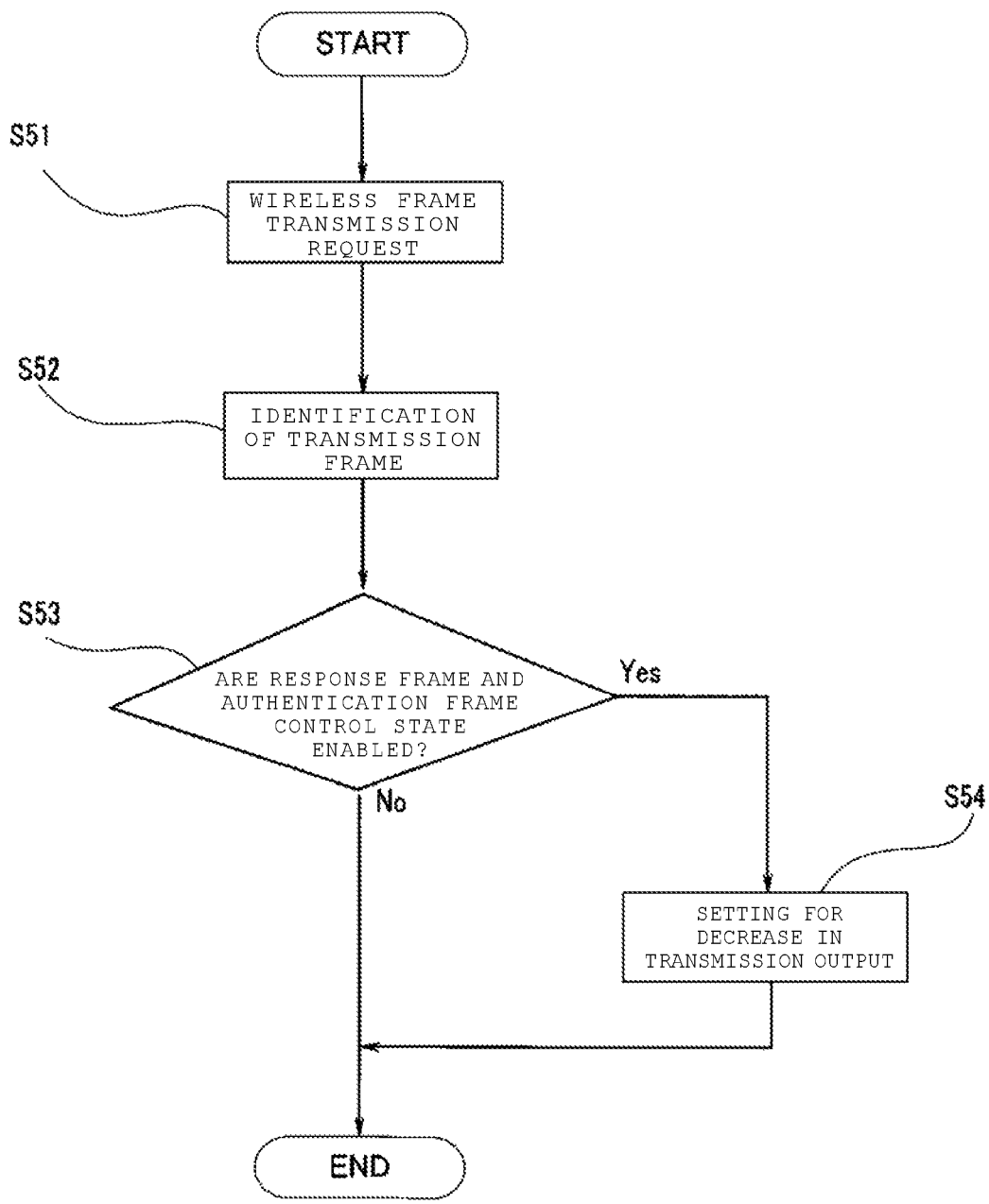
FIG. 22 is a flowchart for describing a frame transmission operation in the wireless access point.

FIG. 22 is a flowchart for describing a frame transmission operation by a wireless access point according to the fourth embodiment. First, a transmission request for a wireless frame is received from another wireless communication terminal or the like (S51). Next, a type of a frame that is transmitted is identified (S52). In a case where the type of the frame that is identified in S52 is the authentication frame (the association response or the probe response), it is further determined whether or not an instruction to perform the authentication frame control, which is provided by the processor 51, is set to be enabled (S53).

In a case where the frame that is transmitted is the authentication frame and where the authentication frame control is set to be enabled (Yes in S53), a transmission power for the frame is decreased (S54) and a frame transmission processing operation is continued. On the other hand, in a case where the frame that is transmitted is a frame other than the authentication frame, such as the data frame, or in a case where the authentication frame control is set to be disabled (No in S53), the frame transmission processing operation is continued.

In this manner, the wireless access point 50 adjusts a transmission power for the authentication frame according to the authentication frame control being enabled or disabled. That is, for the period of time for which the advertisement data is displayed, the transmission power for the frame is decreased and the wireless communication-available area is reduced. Furthermore, for the period of time for which the tutorial data is displayed is lengthened, the transmission power for the frame returns to a normal state and the wireless communication-available area is widened. Therefore, for the period of time for which the advertisement data is displayed, because an area where the wireless communication terminal makes a connection is limited, a majority of users view the advertisement and then make connections of the wireless communication terminals. Because of this, the advertisement effect can be improved and the cost of providing the notionally free-of-charge Internet connection service can be recovered.

It is noted that in the example described above, by the control of either timing at which the authentication frame is communicated, or an area in which the authentication frame is communicated, it is controlled whether or not the wireless communication terminal can be connected to the wireless access point 50, but it may be controlled whether or not the wireless communication terminal can be connected to the wireless access point 50 with control of a beacon frame.

Figure 23:
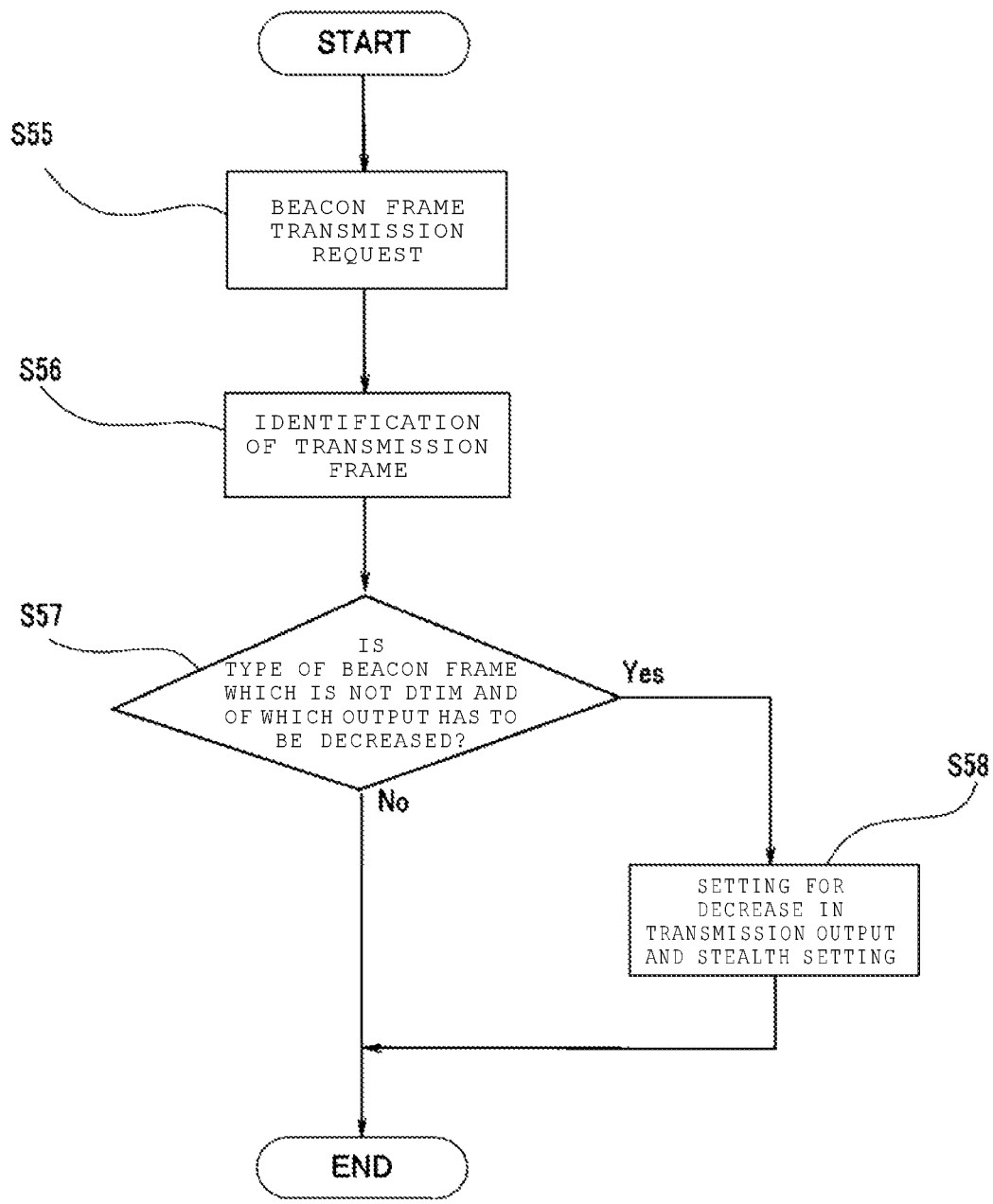
FIG. 23 is a flowchart for describing a beacon transmission operation by the wireless access point.

FIG. 23 is a flowchart for describing a beacon transmission operation by the wireless access point. First, at a beacon interval that is set, a beacon frame transmission request occurs (S55). Next, a type of the beacon frame that is transmitted is identified (S56). In a case where the type of the beacon frame is not a delivery traffic indication message (DTIM) notifying that data is present, and it is determined that the type of the beacon frame is a frame of which a transmission output has to be decreased from a ratio that is set (Yes in S57), the transmission power for the frame is decreased, an SSID field of the beacon frame is overwritten as a stealth AP (S58), and a beacon frame transmission processing operation is continued.

On the other hand, in a case where the type of the beacon frame is the DTIM, or in a case where it is determined that the type of the beacon frame is not the frame of which the transmission output has to be decreased from the ratio that is set (No in S57), the beacon frame transmission processing operation is continued while remaining in a normal state without particularly changing a setting.

In this manner, switching between the stealth state and a non-stealth state and switching of the transmission power is performed on the beacon frame, and thus the time for which the wireless communication terminal can make a new connection can be limited or the wireless communication-available area can be limited. At this time, the DTIM that is necessary to a minimum for maintaining the connection of the wireless communication terminal is detected, and a frame of the DTIM is transmitted in a normal non-stealth state and with a normal power. Then, for a frame other than the DTIM, the stealth state is maintained and the transit power is decreased. Accordingly, the connection of the wireless communication terminal that is previously connected to the wireless access point 50 can be maintained while limiting a new connection of the wireless communication terminal. Therefore, the user convenience can be secured.

It is noted that the switching between enabling and disabling the authentication frame control and control of the sending-out of the beacon frame may be performed at the same time. That is, only during a time span during which the authentication frame control is disabled and the communication of the authentication frame (the association request or response, or the probe request or response) is possible, the beacon frame is transmitted in the non-stealth state and with the normal power. On the other hand, during a time span during which the authentication frame control is enabled and the communication of the authentication frame is impossible, the beacon frame is transmitted in the stealth state and with a low power.

Accordingly, the congestion in the in-use bandwidth can be much more alleviated and the utilization efficiency can be improved. Furthermore, a new connection of the wireless communication terminal can be more reliably limited, and for the period of time for which the authentication frame control is set to be enabled, the advertisement effect can be improved and the cost of providing the free-of-charge Internet connection service can be recovered.

It is noted that for the period of time for which the authentication frame control is set to be enabled, because the existing connection is maintained as well, it is desirable that the frame of the DTIM is transmitted in the normal non-stealth state and with the normal power.

Furthermore, in the example described above, switching between the period of time for which the advertisement data is displayed on the liquid crystal display 53 and the period of time for which the tutorial data is displayed is performed at a time interval that is set in advance, but a human motion sensor may be installed in the vicinity of the liquid crystal display, and a timing or a display time at which the advertisement data is displayed according to a reaction of the human motion sensor may be made to be switched.

For example, when the human motion sensor reacts, the advertisement data is displayed on the liquid crystal display 53, and the authentication frame control is set to change from a disabled state to an enabled state. Then, when the display of the advertisement data is ended, switching to the display of the tutorial data takes place, and the authentication frame control is switched to an enabled state. By performing the control in this manner, the advertisement effect of the digital signage is further increased.

It is noted that during a period of time during which the reaction of the human motion sensor does not take place, because neither a person who views the advertisement nor a person who uses the free-of-charge Internet connection service is present, the display of the liquid crystal display 53 can be stopped, and the authentication frame control can be set to be enabled. In this manner, with a so-called standby mode being entered, the operating cost of the entire system can be decreased, and the congestion in the frequency band that is used for the wireless LAN can be alleviated.

Last, a modification example of the fourth embodiment is described. In the wireless communication system described above, the cost necessary for providing the wireless Internet service free of charge is recovered through an advertising revenue stream by causing the wireless access point to be linked to the viewing of a digital signage. In contrast, in the modification example, the transmission power for the frame is controlled in a minimum condition in which only a targeted user can make a connection to the wireless access point, and thus the operating cost of the wireless Internet can be decreased.

As an example of the wireless communication system in the modification, consider a taxi that provides a free-of-charge wireless Internet service, that is, a taxi that is equipped with the mobile wireless access point. The targeted user in this case is a passenger who rides in the taxi. Therefore, a meter in the taxi is caused to operate in conjunction with the authentication frame control by the wireless access point. While the meter operates (that is, a taxi ride charging state is entered), the authentication frame control is disabled and while the meter does not operate, the authentication frame control is enabled. By performing the conjunctional control in this manner, the transmission of the authentication frame from the wireless access point can be stopped while a passenger is not riding in the taxi and power consumption can be decreased. Furthermore, the congestion in the frequency band that is used for the wireless LAN can be alleviated.

It is noted that, even in a case where the authentication frame control is disabled, it is preferable that the transmission power for the frame is controlled and if possible, transmission is performed with a power so low that the authentication frame is not transmitted substantially to the outside of the vehicle. Furthermore, it is desirable that the beacon frame, as well as the authentication frame, is transmitted with a low power in the same manner. Additionally, in a case where the beacon frame is controlled, if the authentication frame control is enabled, setting to the stealth state takes place, and in a case where the authentication frame control is disabled, setting to the non-stealth state takes place. Thus, the probability that an intended user (a pedestrian or the like who is outside of the vehicle) will be allowed to make a connection to the wireless access point in a state where there is no target user can be much more decreased.

Additionally, the switching of the authentication frame control may be performed in conjunction with a device that detects a travelling state (or motion) of the taxi, such as an acceleration sensor or a gyroscope. That is, in a case where it is determined that the taxi is running, the authentication frame control is set to be disabled and in a case where it is determined that the taxi stops, the authentication frame control is set to be enabled. Because the acceleration sensor and the gyroscope are generally cheap and small-sized, it is possible that the wireless access point can be equipped with an acceleration sensor or gyroscope. Therefore, because the installation cost can be decreased when compared with a case where a taximeter and the wireless access point are caused to operate in conjunction with each other, there is an effect of decreasing the operating cost of the wireless Internet much more.

Because the term "unit" as used in the present specification conceptually corresponds to particular functions in the embodiments, a "unit" does not necessarily correspond to any specific hardware or to software or algorithm on a one-to-one basis. That is, the function (s) of a "unit" may be a combination hardware and software. Therefore, in the present specification, descriptions are provided on the assumption of a virtual circuit block (unit) that has each particular function in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless access point, comprising:
   a wireless communication unit configured to receive a probe request frame that includes attribute information of a wireless communication terminal transmitting the probe request frame and to transmit a probe response frame to the wireless communication terminal in response to the probe request frame;
   a retransmission limit setting unit configured to set a retransmission limit for transmissions of the response frame by the wireless communication unit based on the attribute information included in the probe request frame; and
   a controller configured to control transmission of the probe response frame by the wireless communication unit according to the retransmission limit set by the retransmission limit setting unit, wherein
   when the probe request frame is DSSS modulated and channel information is not registered in a frame body of the probe request frame, the retransmission limit setting unit sets the retransmission limit to a value that is less than a default setting value.

2. The wireless access point according to claim 1, wherein the attribute information includes SSID data.

3. The wireless access point according to claim 2, wherein, when the SSID data is a wild card designation, the retransmission limit setting unit sets the retransmission limit to a value that is less than a default setting value.

4. The wireless access point according to claim 1, wherein the wireless communication unit operates at a frequency of 2.4 gigahertz.

5. The wireless access point according to claim 1, wherein the wireless communication unit is configured to transmit the probe response frame on a same channel on which the probe request frame was received.

6. The wireless access point according to claim 1, wherein DSSS modulation is used for transmission of the probe response frame.

7. The wireless access point according to claim 1, wherein the retransmission limit is set to zero based on the attribute information included in the probe request frame.

8. A wireless access point, comprising:
   a wireless communication unit configured to receive beacon transmissions from other wireless access points;
   a storage unit storing a list of conditions corresponding to information to be provided by a beacon transmission received by the wireless communication unit, the list of conditions being correlated with particular communication settings; and
   an access point controller configured to control a communication state of the wireless communication unit, the access point controller determining whether information provided by beacon transmissions received by the wireless communication unit corresponds to the list of conditions and, if so, setting the communication state of the wireless communication unit according to the particular communication settings correlated with the list of conditions, wherein
   the information provided by the beacon transmissions includes a source network identification and a radio wave strength, and
   the list of conditions includes a particular source network identification and a radio wave strength threshold value.

9. The wireless access point according to claim 8, further comprising:
   an antenna for receiving the beacon transmissions and communicating with one or more wireless communication terminals; and
   an upstream network interface by which the one or more wireless communication terminals connected to the wireless communication unit through the antenna is connected to a communication network.

10. The wireless access point according to claim 8, wherein the access point controller places in the wireless communication unit in a communication suppression state from a normal communication state when it is determined that both the source network identification in a beacon transmission matches the particular source network identification and the radio wave strength of the beacon transmission exceeds the radio wave strength threshold value.

11. The wireless access point according to claim 8, wherein the access point controller places in the wireless communication unit in a stopped state from a normal communication state when it is determined that a source network identification in a beacon transmission matches a particular source network identification in the list of conditions and a radio wave strength of the beacon transmission exceeds a radio wave strength threshold value in the list of conditions.

12. A wireless access point apparatus, comprising:
an electronic display for display of a consumer advertisement and other information;
a display controller connected to the display and configured to control the display to display the consumer advertisement and the other information;
a wireless access point through which wireless communication terminals connect to a communication network; and
a processor configured to control the wireless access point according to information being displayed on the electronic display, wherein
the processor controls the wireless access point to prevent a wireless communication terminal from making an initial connection to the wireless access point when the consumer advertisement is being displayed on the electronic display.

13. The wireless access point apparatus according to claim 12, wherein the other information is tutorial information for explaining how to connect a wireless communication terminal to the wireless access point, and the processor causes the display controller to display the tutorial information after the consumer advertisement information has been displayed.

14. The wireless access point apparatus according to claim 12, wherein the electronic display is a liquid crystal display.

15. A wireless access point, comprising:
a wireless communication unit configured to receive beacon transmissions from other wireless access points;
a storage unit storing a list of conditions corresponding to information to be provided by a beacon transmission received by the wireless communication unit, the list of conditions being correlated with particular communication settings; and
an access point controller configured to control a communication state of the wireless communication unit, the access point controller determining whether information provided by beacon transmissions received by the wireless communication unit corresponds to the list of conditions and, if so, setting the communication state of the wireless communication unit according to the particular communication settings correlated with the list of conditions, wherein
the information provided by the beacon transmissions includes a total number of active access points with a received signal strength exceeding a threshold signal strength value, and
the list of conditions includes a threshold total number of active access points having the received strength exceeding the threshold signal strength value.

* * * * *